United States Patent
Osahor et al.

(10) Patent No.: US 11,836,443 B2
(45) Date of Patent: Dec. 5, 2023

(54) POPULATING CONTACT INFORMATION WITHIN AN ELECTRONIC MESSAGE BASED ON CONTACT RELATIONSHIP INFORMATION

(71) Applicant: Microsoft Technology Licensing, LLC, Redmond, WA (US)

(72) Inventors: Leonard Ndubisi Osahor, Chandler, AZ (US); Julien André Michel Yerma, Sunnyvale, CA (US); Elias Kaplan, Redmond, WA (US); Marie Charlotte-Amalie Mélanie Clemessy, Bellevue, WA (US); Allie Jordan Shuldman, Seattle, WA (US); Rikinkumar Ashwin Shah, Sammamish, WA (US); Ross Edward Smith, IV, Bel Air, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/584,130

(22) Filed: Jan. 25, 2022

(65) Prior Publication Data

US 2023/0237254 A1 Jul. 27, 2023

(51) Int. Cl.
*G06F 40/174* (2020.01)
*G06F 40/30* (2020.01)
(Continued)

(52) U.S. Cl.
CPC .......... *G06F 40/174* (2020.01); *G06F 3/0482* (2013.01); *G06F 3/0484* (2013.01);
(Continued)

(58) Field of Classification Search
CPC .... G06F 40/30; G06F 3/04817; G06F 3/0482; G06F 3/0484; H05L 51/48
See application file for complete search history.

(56) References Cited

U.S. PATENT DOCUMENTS

| 7,886,015 B2 | 2/2011 | Mabry | |
| 8,306,809 B2 * | 11/2012 | Hammer | G06Q 10/107 704/9 |

(Continued)

FOREIGN PATENT DOCUMENTS

JP 2007193717 A 8/2007

OTHER PUBLICATIONS

"Content and Recipient Builders", Retrieved from: https://help.sap.com/viewer/c94ed5fcb5fe4e0281f396556743812c/2105/en-US/52a5500d0d17403bb2416dda53ba9988.html, Retrieved Date:Sep. 17, 2021, 4 Pages.

(Continued)

*Primary Examiner* — William L Bashore
*Assistant Examiner* — Gregory A Distefano
(74) *Attorney, Agent, or Firm* — RAY QUINNEY & NEBEKER P.C; James Bullough

(57) ABSTRACT

When composing an electronic message having at least one intended recipient, a contact manager provides contact information for one or more related recipients. The contact manager may receive an identifier associated with the intended recipient(s), which may be used to lookup and identify contact information for related recipient(s). The contact manager may access a contact database, and, using the identifier and relationship information, determine a contact for the related recipient. The contact manager may then populate the contact information for the contact in a recipient field or other compose surface.

20 Claims, 17 Drawing Sheets

(51) Int. Cl.
*G06F 3/0482* (2013.01)
*G06F 3/0484* (2022.01)
*G06F 3/04817* (2022.01)
*H04L 51/48* (2022.01)

(52) U.S. Cl.
CPC .......... *G06F 3/04817* (2013.01); *G06F 40/30* (2020.01); *H04L 51/48* (2022.05)

(56) References Cited

U.S. PATENT DOCUMENTS

| | | | |
|---|---|---|---|
| 8,606,864 | B2 | 12/2013 | Buchheit |
| 10,425,438 | B1 | 9/2019 | Friedman et al. |
| 2006/0143278 | A1* | 6/2006 | Bauchot ................ G06Q 10/107 709/206 |
| 2006/0173936 | A1* | 8/2006 | Castro ................ H04L 12/1822 |
| 2008/0071873 | A1* | 3/2008 | Gross ...................... H04L 51/48 709/206 |
| 2008/0133571 | A1* | 6/2008 | O'Sullivan .......... G06Q 10/107 707/999.102 |
| 2009/0049137 | A1* | 2/2009 | Muller .................. G06Q 10/10 709/225 |
| 2009/0248819 | A1 | 10/2009 | Hutchison et al. |
| 2009/0292785 | A1* | 11/2009 | Leedberg ................ H04L 51/04 709/206 |
| 2013/0254830 | A1* | 9/2013 | Moganti ................ H04L 63/08 726/1 |
| 2014/0067942 | A1* | 3/2014 | Carrigan ............. G06Q 10/107 709/204 |
| 2015/0113071 | A1 | 4/2015 | Deedwaniya et al. |
| 2016/0062984 | A1* | 3/2016 | Caliendo, Jr. ........... H04L 51/48 704/9 |
| 2021/0119954 | A1 | 4/2021 | Meling et al. |

OTHER PUBLICATIONS

"SAP Knowledge Base Article—Public", Retrieved from: https://userapps.support.sap.com/sap/support/knowledge/en/3011386, Sep. 17, 2021, 4 Pages.

Park, Jaeyou, "How to Mention Someone in a Gmail Thread", Retrieved from: https://tryshift.com/blog/gmail-hub/how-to-mention-someone-gmail-thread/, Oct. 17, 2018, 7 Pages.

"International Search Report and Written Opinion Issued in PCT Application No. PCT/US22/048118", dated Feb. 21, 2023, 10 Pages.

* cited by examiner

POPULATING CONTACT INFORMATION WITHIN AN ELECTRONIC MESSAGE BASED ON CONTACT RELATIONSHIP INFORMATION

BACKGROUND

Recent years have seen significant improvements in messaging technology, particularly in connection with improving features that are provided within messaging interfaces. For example, many communication applications have been configured to autocomplete contact information or provide recipient recommendations based on one or more letters typed into a recipient field. These conventional systems often rely on previous communications or recipient contact information maintained by a particular individual that is preparing or sending the electronic communication.

While conventional communication applications have been configured to provide recommendations for contacts based on a history of previous communications or based on contacts of an individual account, these systems have a number of problems in relation to accuracy, efficiency, and flexibility of operation. For instance, conventional systems are often inefficient in how they inform a user about relationships between the user and other contacts in a contact list. For example, many communication systems require an individual to expressly search out contact information using meta information, such as first name, company name, etc. from a contact database or from a list of known users to find contact information for an individual to place within a recipient field. This may involve drilling down into multiple menus, copying and pasting contact information, as well as other inefficiencies that result in frustration and delays in populating a recipient field when preparing an electronic communication.

In addition, as companies or organizations become larger and more interconnected, conventional communication systems are particularly difficult to navigate with respect to communicating between different groups of employees or sub-organizations. For example, it is often difficult to know which recipients are relevant to a particular project and which parties need to be alerted with respect to certain communications. Currently, many communication systems simply provide reply-all functionality, or often require senders to search through a lengthy history of emails to identify which recipients are relevant to a particular communication. Moreover, as teams and organizations change, these conventional mechanisms for populating recipient fields become inaccurate and unworkable, resulting in further inefficiencies as a result of communications failing to get to the desired recipients.

These and other problems exist with regard generating and transmitting electronic communications using conventional electronic messaging systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more embodiments described herein relate to a method for composing a communication within an electronic communication application. The method may include an act of identifying an intended recipient of an electronic communication. The method may include an act of receiving a recipient identifier indicating a related recipient associated with the intended recipient. The method may include an act of accessing relationship information between the intended recipient and the related recipient from a contact database, the relationship information being maintained for respective contacts in the contact database. The method may include an act of determining at least one contact from the contact database based on the recipient identifier and the relationship information. The method may further include an act of populating a recipient field of the electronic communication with the at least one contact within a graphical user interface (GUI) of a computing device. (e.g., within a messaging interface of an electronic messaging application).

In one or more embodiments, identifying the intended recipient is based on detecting a communication address for the intended recipient within a recipient field of a communication application. In one or more embodiments, populating the recipient field includes populating the recipient field with at least one communication address for the at least one contact within a primary recipient field or a secondary recipient field of the communication application.

In one or more embodiments, receiving the recipient identifier includes detecting entry of a reference to a relationship of the intended recipient. In one or more embodiments, the reference to the relationship includes an indication of a hierarchical relationship within an organization included within the contact database. In one or more embodiments, the reference to the relationship includes a relationship term having a semantic meaning. In one or more implementations, determining the at least one contact includes comparing the semantic meaning to the relationship information to estimate the at least one contact from the contact database that is predicted to match the semantic meaning of the relationship term.

In one or more embodiments, receiving the recipient identifier includes detecting selection of the intended recipient. Receiving the recipient may further include providing, via the GUI, one or more icons associated with one or more recipient identifiers, the one or more recipient identifiers being associated with one or more contacts from the contact database. Receiving the recipient identifier may further include detecting selection of an icon from the one or more icons.

In one or more embodiments, identifying the intended recipient includes identifying a communication address of the intended recipient in a first recipient field of the electronic message. In one or more embodiments, populating the contact information includes populating the contact information in a second recipient field of the electronic message. For example, in one or more implementations, the first recipient field is a primary recipient field while the second recipient field is a secondary recipient field.

In one or more embodiments, receiving the recipient identifier includes detecting an entry of the recipient identifier in a body of the electronic communication.

In one or more embodiments, identifying the intended recipient includes identifying a plurality of intended recipients. Further, in one or more embodiments, the relationship information includes relationship information for each intended recipient of the plurality of intended recipients. In this example, determining the at least one contact may include determining at least one first contact associated with a first intended recipient of the plurality of intended recipients and at least one second contact associated with a second intended recipient of the plurality of intended recipients. In one or more embodiments, the recipient identifier includes a single identifier indicating at least one related recipient for each of the first intended recipient and the second intended recipient.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 4-1 through 4-3 are representations of a messaging interface, according to at least one embodiment of the present disclosure;

FIGS. 7-1 and 7-2 are representations of a messaging interface, according to at least one embodiment of the present disclosure;

DETAILED DESCRIPTION

Figure 1:
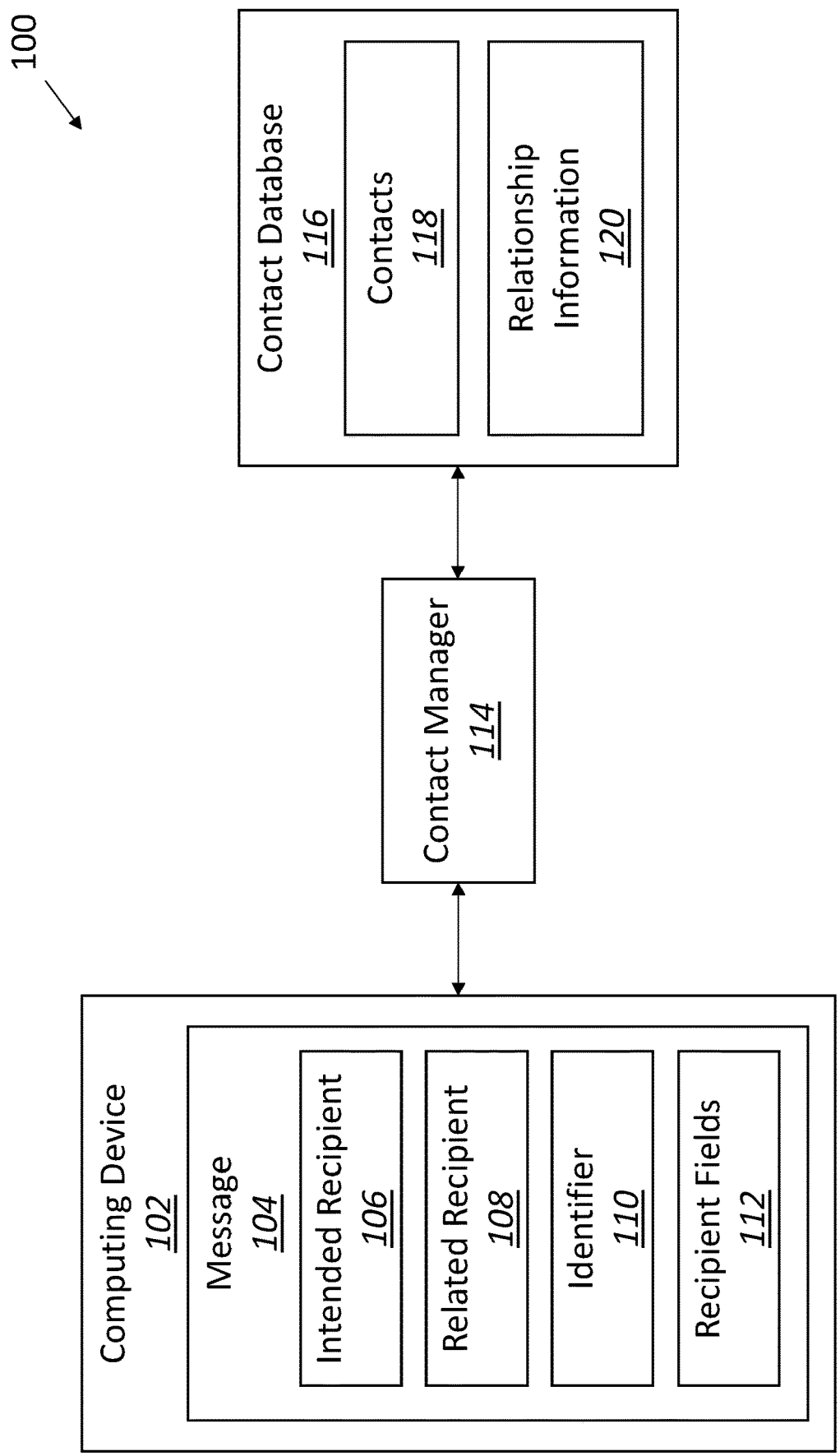
FIG. 1 is a representation of a computing environment on which a contact manager can be implemented according to at least one embodiment of the present disclosure.

This disclosure generally relates to devices, systems, and methods for populating contact information for contacts related to an intended recipient. When generating an email (or other electronic communication), a contact manager may identify a recipient of the communication. Based on the identified recipient, the contact manager may identify the relationships between the recipient and other contacts within a contact list. Based on the relationships, the contact manager may provide one or more recommendations for additional recipients of the communication. For example, the contact manager may provide recommendations to add the recipient's manager, team member, subordinate, or other related contact to the recipient field of an electronic communication. In this manner, the contact manager may streamline the communication drafting process.

As an illustrative example, a method for generating a communication may include identifying an intended recipient of an electronic communication. A contact manager may receive an identifier associated with an intended recipient that may be used to lookup and identify contact information for a related recipient. For instance, as will be discussed in further detail below in connection with a number of examples, an identifier may refer to a "manager" of an intended recipient, which may be used to identify a related recipient corresponding to an individual who is a manager of the intended recipient. Based on the identifier, the contact manager may access relationship information for the intended recipient. In one or more embodiments described herein, the relationship information includes contacts in a contact database. The contact manager may determine at least one contact from the contact manager based on the recipient identifier and the relationship information. The contact manager may then provide contact information for the at least one contact within a graphical user interface (GUI) of a computing device (e.g., within a communication interface of an electronic communication application implemented on the computing device).

In accordance with at least one embodiment of the present disclosure, a contact database may include relationship information between different contacts in the contact database associated with various individuals. For examples, the contact database may include hierarchical relationship information, such as an indication of a contact's manager, who the contact reports to, teammates, assistants, or other relationships within a hierarchy of an organization indicated within the contact database. Other examples herein may refer to more generic examples, such as a contact's family member or any other relationship defined within the relationship information (e.g., within a contact profile). This information may be provided (e.g., input) by the user, by an organizational administration, a human resources department, information technology group, any other user, and combinations thereof.

In some embodiments, the contact manager may provide contact information for the related recipient based on input received via the GUI of a computing device. For example, a user may input a recipient identifier or other input for a related recipient into the GUI. Using the identifier and associated relationship information from the contact database, the contact manager may identify one or more contacts for the related recipient. For example, a recipient identifier may be "manager," indicating the intended recipient's manager. Using the relationship information for the intended recipient, the contact manager may determine that a particular contact from the contact database is the intended recipient's manager and provide a recommendation for a related recipient.

In some embodiments, the contact manager may determine the identifier of the related recipient based on indirect input. For example, the contact manager may determine the identifier based on a semantic meaning of the recipient identifier. In one or more embodiments, the identifier may be determined based on context in the electronic message. In some examples, the contact manager may determine the identifier based on commonly included contacts. In some examples, the contact manager may determine the identifier based on previous messages in a message thread (e.g., without requiring that the user go through one or multiple threads to identify relevant recipients).

Moreover, while one or more embodiments described herein relate specifically to content entered within different fields of an electronic communication by way of a text-based input mechanism, features described in connection with conventional GUIs and input devices may apply to a variety of input mechanisms. For example, in addition to text-based input mechanisms described herein, other implementations may include voice input mechanisms, such as microphones, voice-to-text software, and natural language processing that may detect identifiers associated with intended recipients to facilitate identifying related recipients in accordance with one or more embodiments described herein. As a non-limiting example, a computing device may use a voice input mechanism that enables a user to provide a vocal input of "email John's manager," which the contact manager may process to detect an identifier of "manager" associated with an intended recipient of "John." The identifier may further be used to identify contact information corresponding to a manager of John from a contact database. This example may incorporate additional features described herein in connection with other implementations.

As an illustrative example, and consistent with one or more embodiments described herein, a user of a computing device could provide a first command (e.g., a verbal or typed command) indicating "send an email to Jim", which a messaging application and/or contact manager could process by identifying and adding contact information associated with an intended recipient of "Jim" to the to: field of an electronic message. The user of the computing device could provide a second command (e.g., a verbal or typed command) indicating "Add Jim's manager to the email", which the contact manager could process by determining an identifier of a related recipient (e.g., "manager" or "Jim's manager"), identifying contact information mapped to the recipient identifier, and adding contact information associated with one or more individuals associated with the identifier to a primary or secondary recipient field of the electronic message.

The messaging system provides many advantages and benefits over conventional systems and methods. For example, by reviewing the recipient identifier and the relationship information in the contact database, the messaging system improves efficiency relative to conventional systems. Specifically, the messaging system provides related recipients of the electronic message directly in the message interface, without burying the related recipients under layers of files that would otherwise involve a sender looking up individual user profiles and/or reading through often involved message threads to identify a relevant recipient. In this manner, the contacts manager may significantly reduce the time it takes a computing device to prepare an electronic message.

The messaging systems discussed herein may improve the flexibility of operation by transmitting contact information for a related recipient to a different recipient field than the intended recipient. Different recipient fields, such as to:, cc:, and bcc:, may provide an indication of the level of importance of and/or the level of attention applied to the electronic message. For example, a sender may desire to include a recipient's manager as a primary recipient (e.g., included within a to: field) or secondary recipient (e.g., included within a cc: or bcc: field) of an email. In one or more embodiments of the present disclosure, when the individual is the intended recipient, the contact manager may populate the individual's manager's contact information in the cc: or bcc: recipient field based on detection of a recipient identifier within the electronic communication (e.g., within a recipient field of an email). In this manner, the sender of the message may easily prepare and send the message with the appropriate level of attention and importance to each party.

In addition, as will be discussed herein, one or more embodiments may involve using natural language processing in connection with a variety of input types (e.g., typed input, voice input) to determine a semantic meaning of an identifier provided in conjunction with an intended recipient. By determining the semantic meaning in this fashion, the implementations described herein enables the configurations herein to identify a mapping between the identifier (e.g., a semantic meaning of the identifier) and contact information (e.g., a communication address) from a contact database.

As will be discussed herein, one or more embodiments additionally leverage shared information from a contact database to identify relationships between an intended recipient and one or multiple related recipients from the contact database. This granting of access to relationship information from the contact database enables an individual to add one or more recipients without necessarily having any knowledge of an intended recipient's organization. Moreover, this allows an application to populate a recipient field with contact information for the related recipient automatically based on the determined relationship between the intended recipient and a communication address of a related recipient without involving manual access or search of a contact database by a sender.

In addition, one or more embodiments described herein involve providing an interactive interface (e.g., an application GUI) that includes one or more selectable icons associated with one or more recipients upon recognizing an identifier associated with an intended recipient. This display of the icons based on recognizing the identifier provides a GUI alternative to manually searching a contact database. In addition, this enables a sender to selectively identify one or multiple contacts associated with a recipient identifier to conveniently add a communication address for one (or multiple) related recipients within a recipient field of an electronic communication.

As illustrated by the foregoing discussion, the present disclosure utilizes a variety of terms to describe features and advantages of the messaging system. Additional details are now provided regarding the meaning of such terms. For example, as used herein, the term "electronic communication" or "electronic message" may refer interchangeably to any communication transmitted between two computing devices. By way of example and not limitation, the term electronic message can include email, text messages, instant message, social media messaging, social media posting, and combinations thereof. For ease of illustration, the term "message" may be used interchangeably with the term "electronic message;" unless otherwise specified, a "message" as used herein should be interpreted herein as an "electronic message." In some embodiments, electronic messages, as discussed herein, are messages that are in the process of being composed, or messages that have not been sent. Nevertheless, in some embodiments, an electronic message may refer to a message that has already been sent or is in the process of being sent.

As used herein, an "intended recipient" of an electronic message is any recipient who's contact information is entered into a recipient field. For example, an intended recipient may be the primary recipient of a message or refer exclusively to one or more recipients in a primary recipient field of the electronic message. In some embodiments, an intended recipient is any recipient entered into any recipient field of a message. In some embodiments, a message includes more than one intended recipient. In some embodiments, the intended recipient is entered into a primary recipient field, such as the to: field. In some embodiments, the intended recipient is entered into any recipient field, such as the cc: or bcc: field.

In accordance with at least one embodiment of the present disclosure, a "related recipient" of an electronic message is any recipient in a recipient field of the message based on a relationship with one or more intended recipients. The related recipient may have any relationship with the intended recipient, including manager, direct report, teammate, friend, family member, acquaintance, and so forth. The related recipient may be added to the same recipient field as the intended recipient or to a different recipient field as the intended recipient.

As used herein, a "recipient field" is any field of an electronic message that receives input for contact information for a recipient. The recipient field may include an input field in a user interface (UI) or GUI. In some embodiments, a user enters alphanumeric text into a recipient field to enter the contact information. In some embodiments, the recipient field is populated by a contact manager or other aspect of a messaging system. For example, a contact manager may enter a contact identifier or specific contact information (e.g., an email address) based on detecting a username or other user identifier within the recipient field. In some embodiments, a message may include a single recipient field. In some embodiments, a message may include multiple recipient fields. For example, email messages commonly include a primary recipient field (e.g., a to: field) intended to identify the primary recipient(s) of a message and one or more secondary recipient fields (e.g., a cc: field, a bcc field) intended to identify secondary recipients of a message. While the recipients in the to: field and the cc: field are visible to each other, recipients in the bcc: field are not visible to other recipients. A recipient field may receive any type of contact information compatible with a message type. For example, an email recipient field may receive email addresses, a text messaging recipient field may receive phone numbers, an instant messaging field may receive an IM handle, and so forth.

In accordance with one or more embodiments of the present disclosure, "relationship information" is any information that identifies a relationship between contacts in a contact database. For example, relationship information may include a corporate organization chart associated with a hierarchical organization of contacts that identifies managers, direct reports (e.g., subordinates, or people that report to a manager), team members (e.g., people that report to the same manager), co-workers (e.g., people that report to different managers), any other relationship information, and combinations thereof. In some examples, relationship information may include personal relationship information, such as familial relationships (e.g., mom, dad, brother, sister, aunt, uncle, nephew, niece), friend groups, social groups, and so forth. Indeed, relationship information may include any information associated with a given contact within a contact profile.

In some embodiments, relationship information is tied to a single contact. For example, a single contact entry in a contact database may include relationship information indicating the contact's relationship with one or more other contacts in the contact database. In some embodiments, two contacts may be connected using multiple different types of relationship information. For example, two contacts may be connected with both professional relationship information and personal relationship information. In some examples, two contacts may be connected with two different types of professional relationships, such as team members for one particular project and co-workers for a different project. In some embodiments, the relationship information is maintained in the contact database. For example, the relationship information may be entered and maintained by one or more groups within an organization, such as human resources, IT, and so forth.

As used herein, a "contact database" may include any database that includes two or more contacts. In some embodiments, a contact database is stored locally on a computing device. In some embodiments, a contact database is stored remotely on a remote server or other remote storage location. In some implementations, the contact database is provided as a service. Contacts within the contact database may include one or more types of contact information or communication addresses that enable a communication application to deliver electronic communications to one or more recipients. Examples of communication addresses may include email addresses, desk phone numbers, mobile phone numbers, personal phone numbers, first and last names, display name, aliases, and handles (e.g., @name). In one or more embodiments described herein, the contact information includes the relationship information indicating other contacts from a contact database that are related to a given contact. As noted above, this relationship information may include the specific nature of the relationship, such as relationship within an organizational hierarchy as well as personal relationship information.

As used herein, a "recipient identifier" or simply "identifier" may be used interchangeably to refer to a related recipient of a message. An identifier may include a relationship identification that identifies a relationship between the intended recipient and a related recipient. For example, an identifier may include an indication of the intended recipient's manager, direct report, teammate, family member, acquaintance, and so forth. In some embodiments, the identifier is received as input from a user. In some embodiments, the identifier is determined based on context of the message. In some embodiments, the identifier is determined based on trends and associations in previous messages. In one or more embodiments, an identifier refers to a term that may be mapped to a certain relationship of an intended recipient(s). Using the identifier, a contact manager may examine relationship information in a contact database to find contact information for a related recipient.

FIG. 1 is a representation of a communication environment 100, according to at least one embodiment of the present disclosure. The communication environment 100 includes a computing device 102 capable of composing and sending an electronic message 104 (or simply "message 104"). As shown in FIG. 1, the message 104 includes one or more intended recipients 106 and one or more related recipients 108. The related recipients 108 may be related to the intended recipient 106 based on an identifier 110 (or "recipient identifier") in the message 104. As discussed herein, the identifier 110 may be an explicit identifier. For example, the identifier 110 may include a description of the related recipient 108, a specific reference (such as an @mention, or an @ symbol followed by a portion of the contact for the related recipient 108), any other identifier 110, and combinations thereof. The intended recipient 106 and the related recipient 108 may be entered into one or more recipient fields 112 (e.g., a primary or secondary recipient field).

When composing or drafting a message 104, a contact manager 114 may provide contact information for the related recipient 108. The contact manager 114 may receive or identify the identifier 110 in the message 104 and access a contact database 116 to identify one or more contacts 118 associated with the identifier 110. As shown in FIG. 1, the contact database 116 includes a plurality of contacts 118, each of which has associated contact information, which may specifically include relationship information 120 that indicates relationships between any of the contacts 118. While accessing the contact database 116, the contact manager 114, based on the relationship information 120, may determine at least one contact 118 that maps to the identifier 110 associated with the intended recipient 106. For example, the identifier 110 may indicate a relationship between the intended recipient 106 and a contact that maps to an address of the related recipient 108. The contact manager 114 may review the relationship information 120 for the relationship identified in the identifier 110. This may allow the contact manager 114 to determine the contact 118 to recommend or use as the related recipient 108.

While FIG. 1 illustrates an example implementation in which the contact manager 114 is independent from the computing device 102 and the contact database 116, in one or more embodiments, the contact manager 114 is part of the computing device 102. For example, the contact manager 114 may be stored on the computing device. For example, in one or more embodiments, the contact manager 114 is implemented within a communication application installed and running on the computing device 102. In some embodiments, the contact manager 114 is implemented remotely from the computing device 102, such as on the contact database 116. In one or more embodiments, the contact manager 114 is implemented on a server system (e.g., local server or remote server). In one or more embodiments, the contact manager 114 is implemented on a cloud computing system accessible by any number of computing devices via the Internet. In addition, in one or more embodiments, the contact database 116 is stored on the computing device 102. In some embodiments, the contact database 116 is stored on a remote server, such as a server or cloud database.

In some embodiments, the contact database 116 is an internal contact database that includes contacts 118 for a particular organization (or group of related organizations that have shared contact information with one another). For example, the contact database 116 may be an organizational contact database for a corporate organization, and accessible to individuals within the organization. In some examples, the contact database 116 may be a personal contact list for a user. In some embodiments, the contact database 116 is an external contact database 116. For example, the contact database 116 may be a contact list for an external company with whom the company is partnering. The external company may provide access to their contact database 116 (or at least a part of the contact database 116) to facilitate communication between the two companies.

Figure 2:
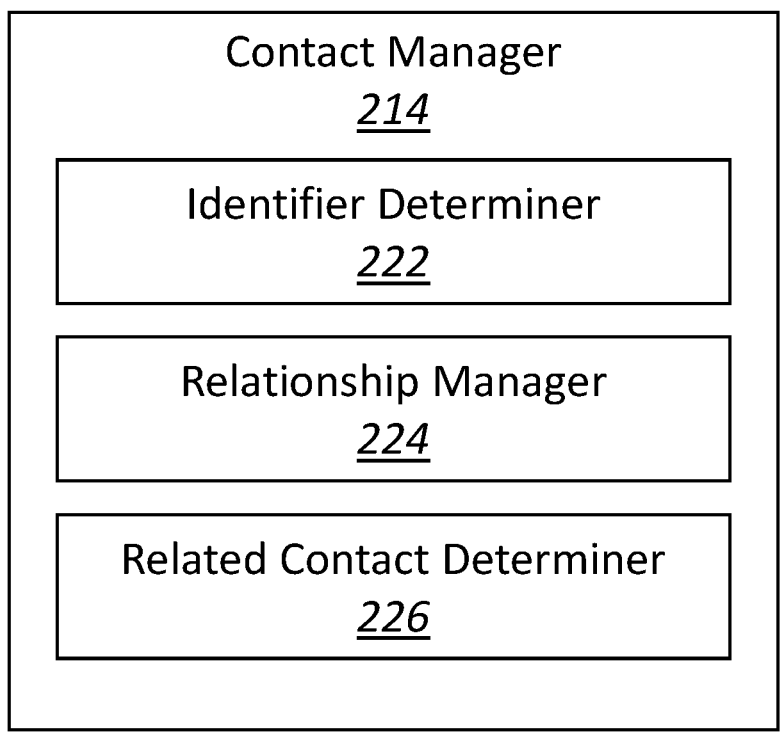
FIG. 2 is a block diagram representation showing a contact manager in accordance with at least one embodiment of the present disclosure.

FIG. 2 is a block diagram showing example components of a contact manager 214, according to at least one embodiment of the present disclosure. The contact manager 214 includes an identifier determiner 222. The identifier determiner 222 may review the message being composed, including any intended recipients in the recipient fields. The identifier determiner 222 may analyze an identifier (e.g., the identifier 110 of FIG. 1) in the message and determine any identification information in the identifier. As discussed herein, the identifier may analyze an identifier that includes an explicit reference to an intended recipient, such as an @mention or other explicit reference. In some embodiments, the identifier determiner 222 determines an identifier based on the intended recipients, and commonly included related recipients of the intended recipients. In some embodiments, the identifier determiner 222 determines an identifier based on information contained in the body of the message.

Using the identifier determined by the identifier determiner 222, a relationship manager 224 may analyze relationships within a contact database. In some embodiments, the identifier may include identification information for an intended recipient's manager. The relationship manager 224 may review the relationship information in the contact database to determine a manager or supervisor of the intended recipient. The relationship manager 224 may analyze the relationship information based on any identification information included in the identifier.

A related contact determiner 226 may determine a contact from the contact database based on the analysis of the relationship manager 224. The related contact determiner 226 may identify the contact information in the contact. In some embodiments, the contact information may include contact information for more than one type of message. For example, the contact information may include one or more of email, phone numbers, instant message handles, names, aliases, any other contact information, and combinations thereof. In some embodiments, the related contact determiner 226 may identify the type of message (e.g., email, text message, instant message) and select the appropriate contact information for the related recipient.

Each of the components of the messaging system 100 and the contact manager 214 can include software, hardware, or a combination of both. For example, the components can include one or more instructions stored on a computer-readable storage medium and executable by processors of one or more computing devices, such as a client device or server device. When executed by one or more processors, the computer-executable instructions of the messaging system 100 and the contact manager can cause the computing device(s) to perform the methods described herein. Alternatively, the components can include hardware, such as a special-purpose processing device to perform a certain function or group of functions. Alternatively, the components of the messaging system 100 and the contact manager 214 can include a combination of computer-executable instructions and hardware.

Furthermore, the components the messaging system 100 and the contact manager 214 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

Figure 3:
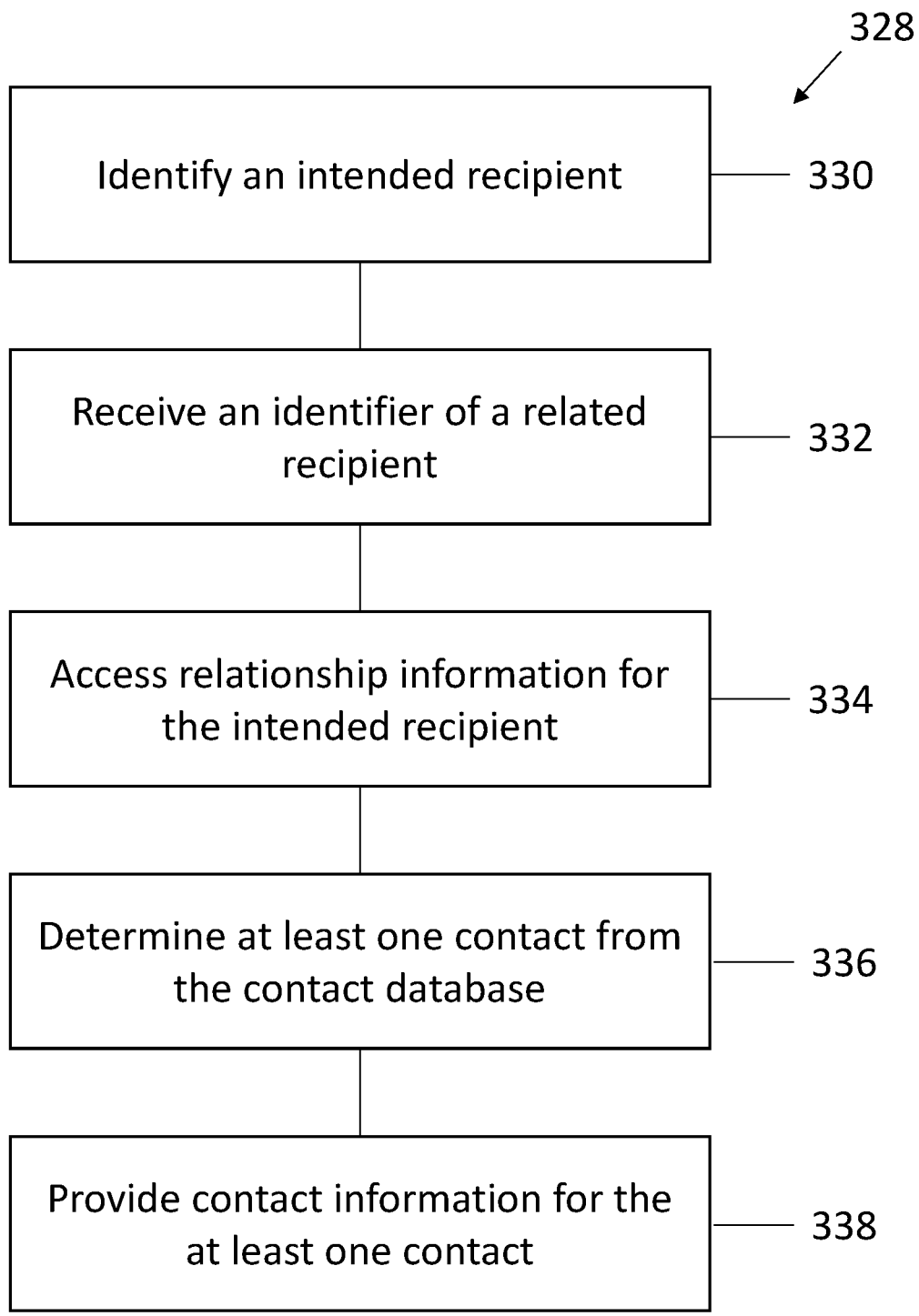
FIG. 3 is an example series of acts for determining a desired recipient when composing an electronic message in accordance with at least one embodiment.

FIG. 3, the corresponding text, and the associated examples provide a series of acts or a method that may be performed by systems, devices, and non-transitory computer-readable media of the messaging environment 100 and the contact manager 214. In addition to the foregoing, one or more embodiments can also be described in terms of flowcharts comprising acts for accomplishing a particular result, as shown in FIG. 3. FIG. 3 may be performed with more or fewer acts. Further, the acts may be performed in differing orders. Additionally, the acts described herein may be repeated or performed in parallel with one another or parallel with different instances of the same or similar acts.

As mentioned, FIG. 3 illustrates a flowchart of a series of acts for preparing an electronic message, in accordance with one or more embodiments. While FIG. 3 illustrates acts according to one embodiment, alternative embodiments may omit, add to, reorder, and/or modify any of the acts shown in FIG. 3. The acts of FIG. 3 can be performed as part of a method. Alternatively, a non-transitory computer-readable medium can comprise instructions that, when executed by one or more processors, cause a computing device to perform the acts of FIG. 3. In some embodiments, a system can perform the acts of FIG. 3.

The series of acts 328 may include identifying an intended recipient of an electronic message at 330. A contact manager may receive an identifier of a related recipient at 332. The contact manager may further access relationship information for the intended recipient at 334. The relationship information may include contacts in a contact database. In some embodiments, the contact manager may determine at least one contact from the contact database based on the identifier of the related recipient and the relationship information at 336. The contact manager may provide, on a GUI, contact information for at least one contact at 338.

In some embodiments, the series of acts 328 further includes receiving a request for the related recipient. For example, a user may input a request to include a related recipient. In some embodiments, the user may input one or more identifiers into an input field on the GUI as a request to include a related recipient. In some embodiments, identifying the intended recipient includes identifying the recipient in a first (or primary) recipient field, such as a to: field. Providing the contact information may include providing the contact information in a second (or secondary) recipient field, such as a cc: field, bcc: field, or other secondary field of the electronic message.

In some embodiments, the contact manager identifies the identifier in the body of the message. In some embodiments, the identifier is received based on a selection of an icon displayed via the GUI. In some embodiments, providing the contact information includes populating the contact information in a recipient field of the message. In some embodiments, the intended recipient includes a plurality of intended recipients and the relationship information may include relationship information for each intended recipient. In some embodiments, the related recipient may be related to at least two of the plurality of intended recipients. For example, the related recipient may be the manager of at least two of the intended recipients.

Figures 1, 4:
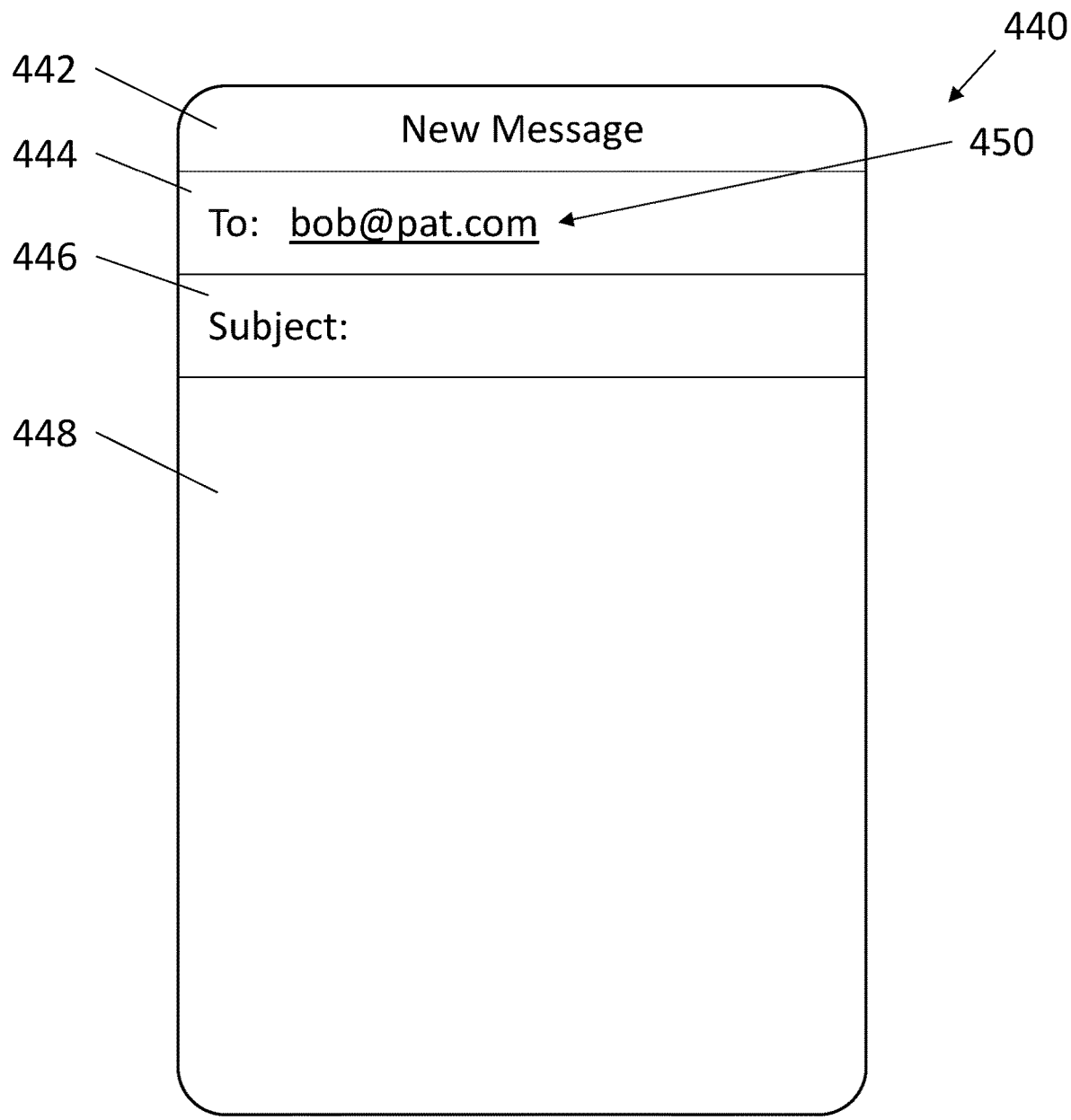
Figures 2, 4:
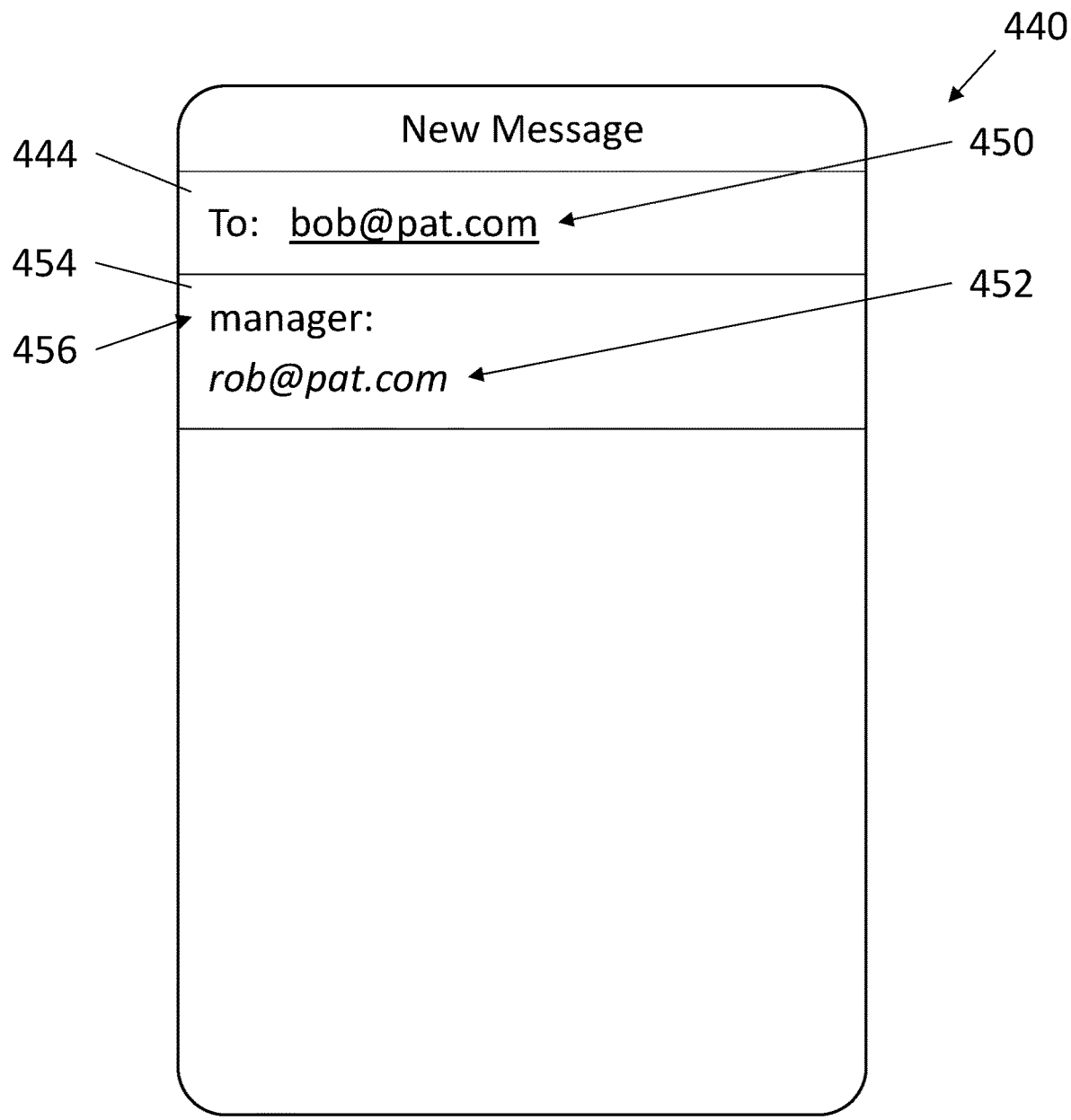
Figures 3, 4:
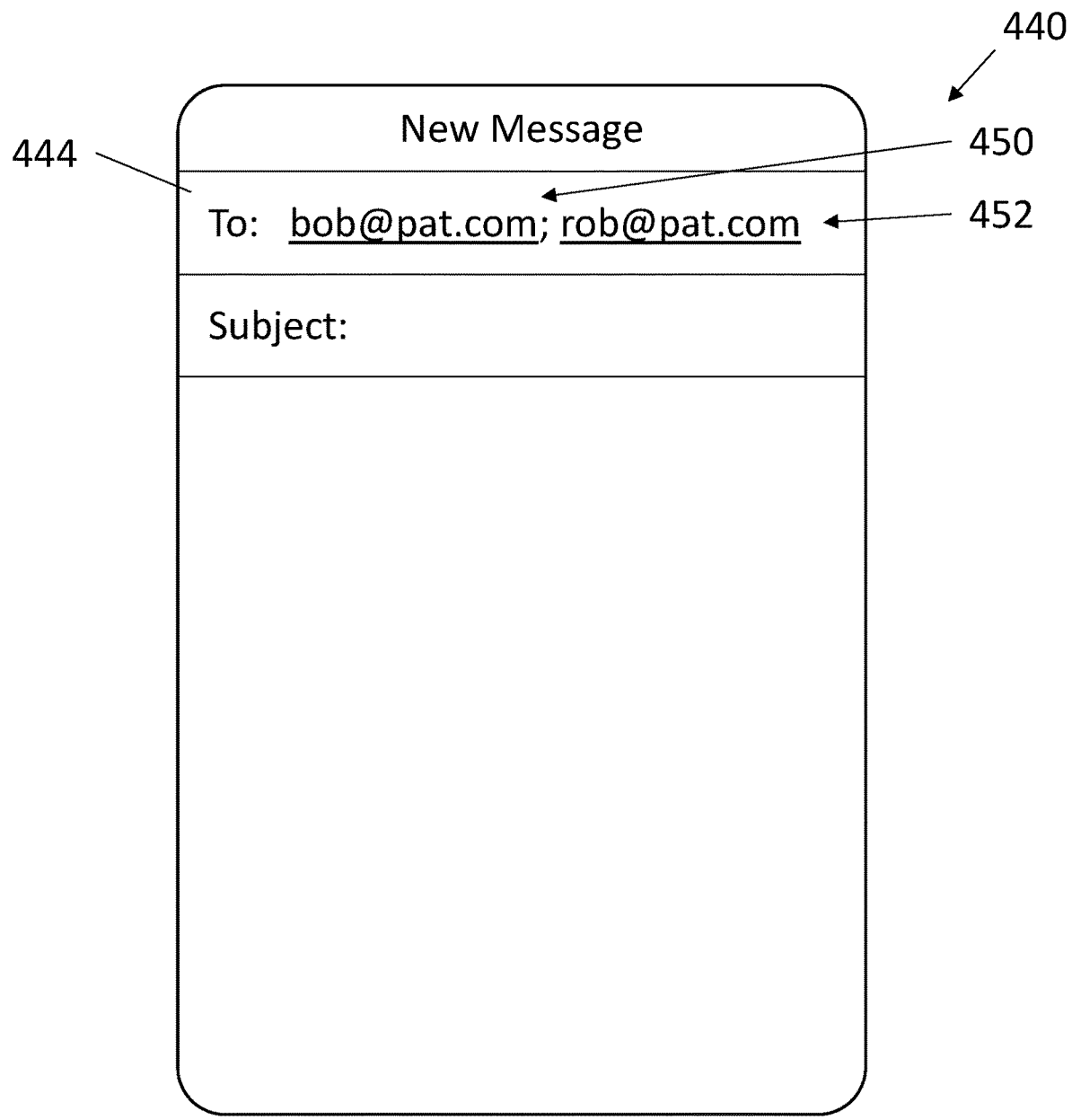

FIG. 4-1 is a representation of a GUI of an electronic message 440 (e.g., an electronic messaging interface), according to at least one embodiment of the present disclosure. In accordance with at least one embodiment of the present disclosure, the GUI may be a GUI for any operating system, computing device, messaging service, or other system that is capable of preparing, composing, compiling, or transmitting messages. While different systems may have different cosmetic surfaces, it should be understood that the techniques discussed herein may be applied to any GUI of any messaging system.

In the example shown in FIG. 4-1, the message 440 includes a title line 442, a recipient field 444, a subject line 446, and a body 448. In the embodiment shown, the title line 442 includes a generic "New Message" title, based on a blank or empty subject line 446. The recipient field 444 includes a to: field. The body 448 of the message 440 shown is empty. In this example, the message 440 may refer to a message that is in the process of being composed, and where a user of a computing device has input contact information for an intended recipient 450 without composing a message within the body 448.

In FIG. 4-2, the contact manager has provided contact information for a related recipient 452. In the example shown, the contact manager may provide a related contact field 454, which may include an indicator 456 (e.g., a title or defined relationship) of a related contact 452 with respect to the recipient identified within the recipient field 444. The user may view the related recipient 452 in the related contact field 454 and determine whether to include the related recipient in the recipient field 444. In some embodiments, the related contact field 452 may include an identifier 456 of the related contact 452. In the embodiment shown, the contact manger has provided contact information for the manager of the intended recipient 450 bob@pat.com. The user may know or infer that the related contact 452 is the manager of the intended recipient 450 based on the provided identifier 454.

In some embodiments, the user may select the contact information for the related recipient 452 to include in the recipient field 444. When the user selects the related recipient, the contact information for the related recipient 452 may be populated into the recipient field 444, as shown in FIG. 4-3. In this manner, as may be seen in FIG. 4-1 through FIG. 4-3, the contact manager may recommend and populate a related recipient 452 into the recipient field 444.

Thus, in accordance with the example shown in FIGS. 4-1 through FIG. 4-3, the contact manager may receive or otherwise identify a recipient based on selection of an icon associated with the recipient identifier(s). For example, in one or more embodiments, the contact manager may detect a selection of the intended recipient 450 and, in response to the selection, provide a listing or dropdown menu showing one or more icons that are identified based on the recipient identifier(s). For instance, where the recipient identifier indicates "manager," "managers," "all managers," "supervisor," or other identifier, the contact manager may provide one or multiple icons associated with one or more contacts from the contact database that are mapped to the specific identifiers with respect to the intended recipient 450. Upon detecting selection of one of the icons, the contact manager may populate the recipient field 444 with the contact information associated with the selected icon(s).

Figure 5:
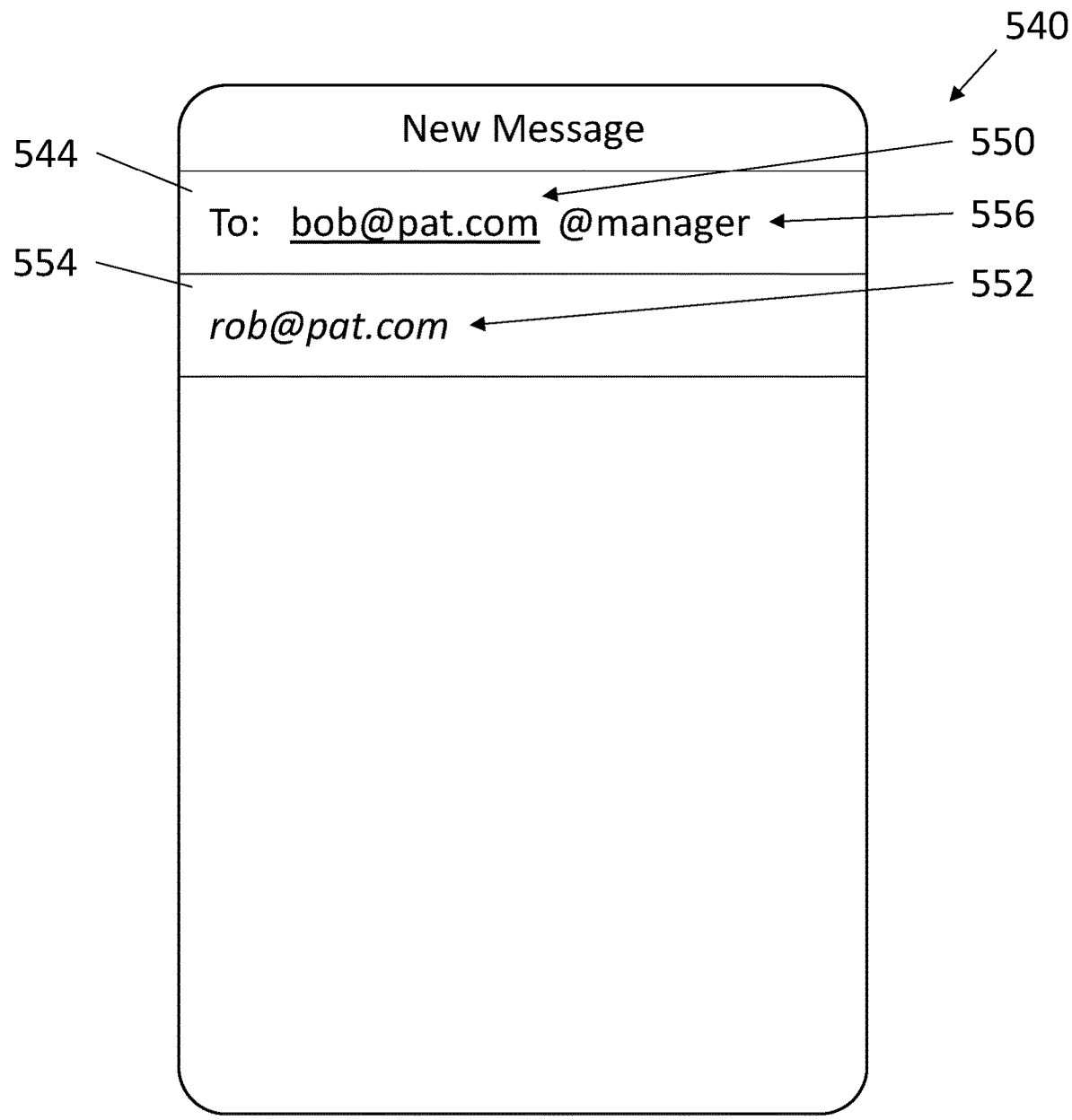
FIG. 5 a representation of a messaging interface, according to at least one embodiment of the present disclosure.

As another illustrative example, FIG. 5 shows a representation of a GUI of a message 540, according to at least one embodiment of the present disclosure. The message 540 includes an intended recipient 550 entered or input into a recipient field 544. The contact manager may receive an identifier 556 in the recipient field 544. In the embodiment shown, the identifier 556 is an @mention of the manager of the intended recipient 550. Nevertheless, as mentioned above, the identifier 556 may refer to any term or set of terms that may be used to determine corresponding relationship information from a contact database.

When the contact manager receives the identifier 556, the contact manager may access the contact database and retrieve contact information for a related recipient 552. The contact manager may provide the contact information for the related recipient 552 in the related contact field 554. To populate the related recipient 552 in the recipient field 544, the user may simply select (e.g., click, tap) an icon of the related recipient 552. The contact manager may then populate the contact information for the related recipient 552 in the recipient field 544, similar to the implementation discussed above in connection with FIG. 4-3.

In some embodiments, the contact manager may be alerted to the presence of the identifier 556 in the recipient field 544 by the @mention, or by the @ symbol at the beginning of the identifier 556. It should be understood, however, that the contact manager may be alerted to the presence of the identifier 556 in any other manner, including a specific handle, a specific word or phrase, or other mechanism to identify the identifier 556.

Figure 6:
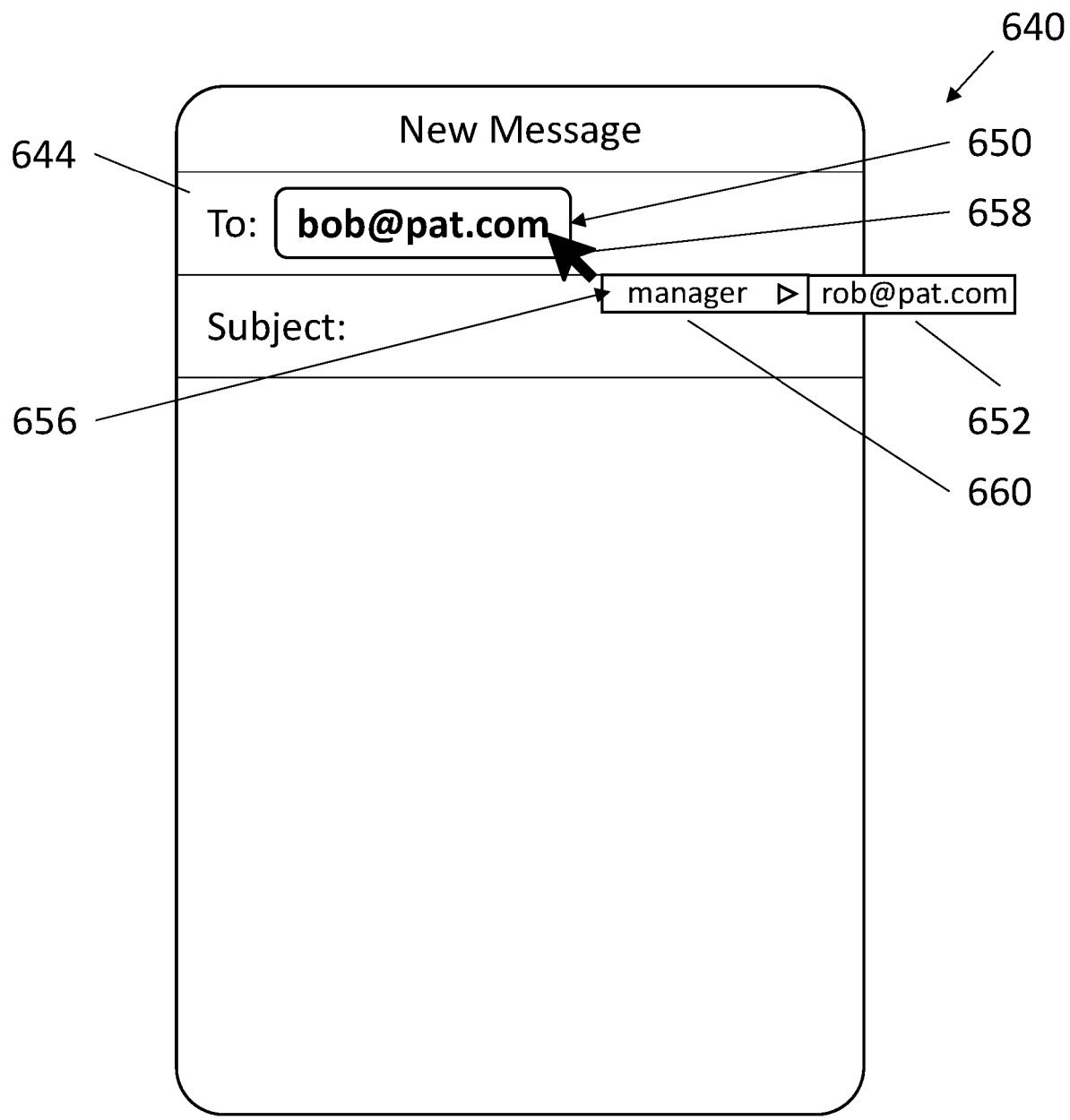
FIG. 6 a representation of a messaging interface, according to at least one embodiment of the present disclosure.

FIG. 6 is a representation of a GUI of a message 640, according to at least one embodiment of the present disclosure. The message 640 includes an intended recipient 650 entered or input into a recipient field 644. The contact manager may receive a selection of the intended recipient 650. In some embodiments, the contact manager may receive a request for a related recipient 652 based on the contact manager detecting the selection of the intended recipient 650. For example, the user may select the intended recipient 650 using a selector icon 658. In some examples, the user may select the intended recipient 650 by touching a touch screen, using voice input, any other input, and combinations thereof.

After receiving the selection, the contact manager may provide a listing of contacts based on any identified relationships with the intended recipient 650. For example, as shown in FIG. 6, the contact manager may present a drop-down menu 660 on the GUI of the message 640. The drop-down menu 660 shown includes a single selection of an identifier 656. In one or more embodiments, the drop-down menu 660 may include additional selections or options. For example, the drop-down menu 660 may include selections for multiple identifiers 656, such as in an example where the recipient identifier is "all managers," "team members" or other identifier that implies multiple related recipients related to the intended recipient 650. The additional identifiers 656 may be representative of one or more relationships of the intended recipient 650 within the contact database. In some embodiments, the drop-down menu 660 may include other selections, including common selections such as copy, paste, and so forth.

When the contact manager receives a selection of the identifier 656, the contact manager may populate contact information for a related recipient 652 in the drop-down menu 660. The user may then select the related recipient 652 and the contact manager may populate the contact information for the related recipient 652 in the recipient field 644, similar to the example described above in connection with FIG. 4-3.

Figures 1, 7:
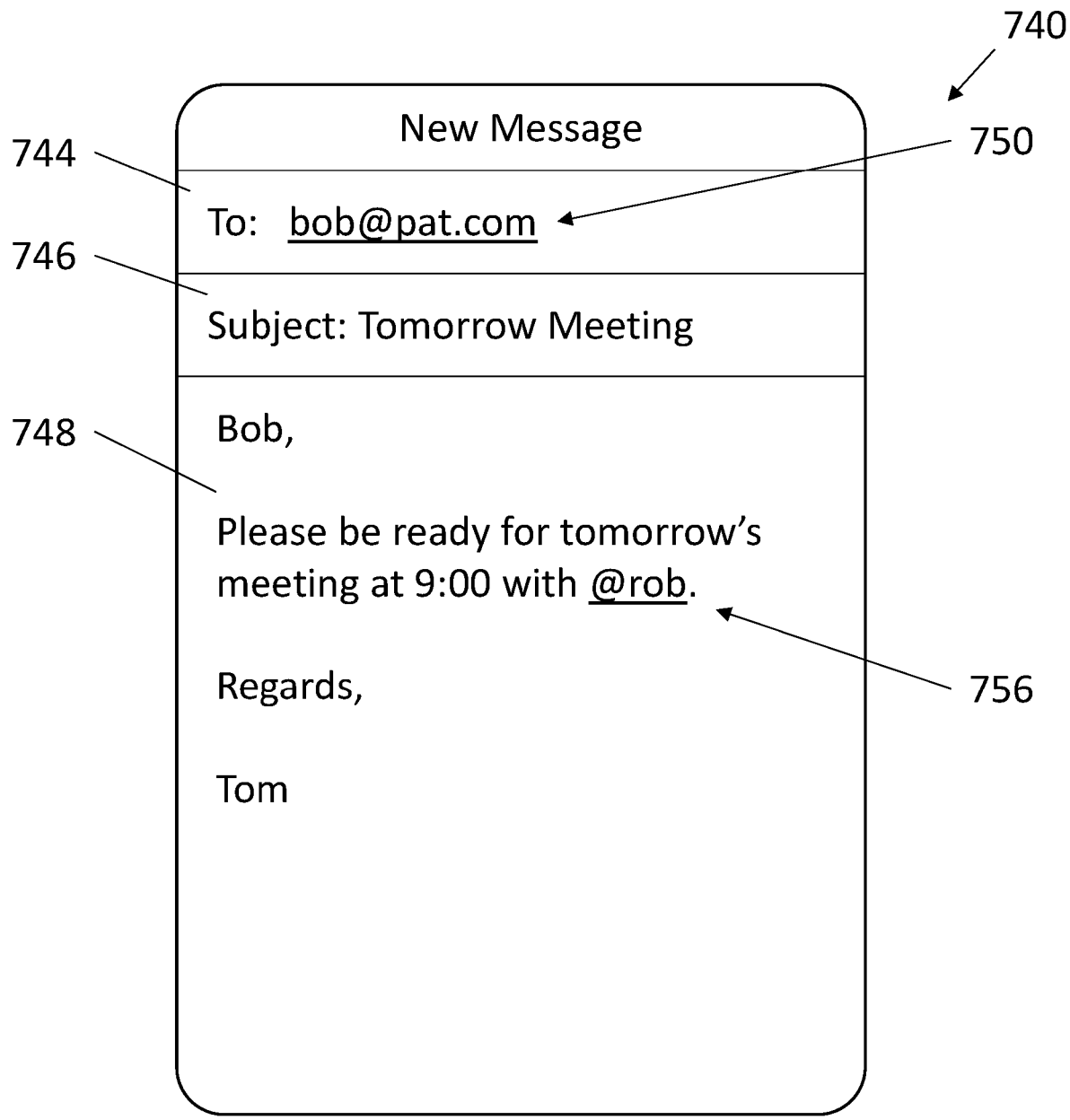
Figures 2, 7:
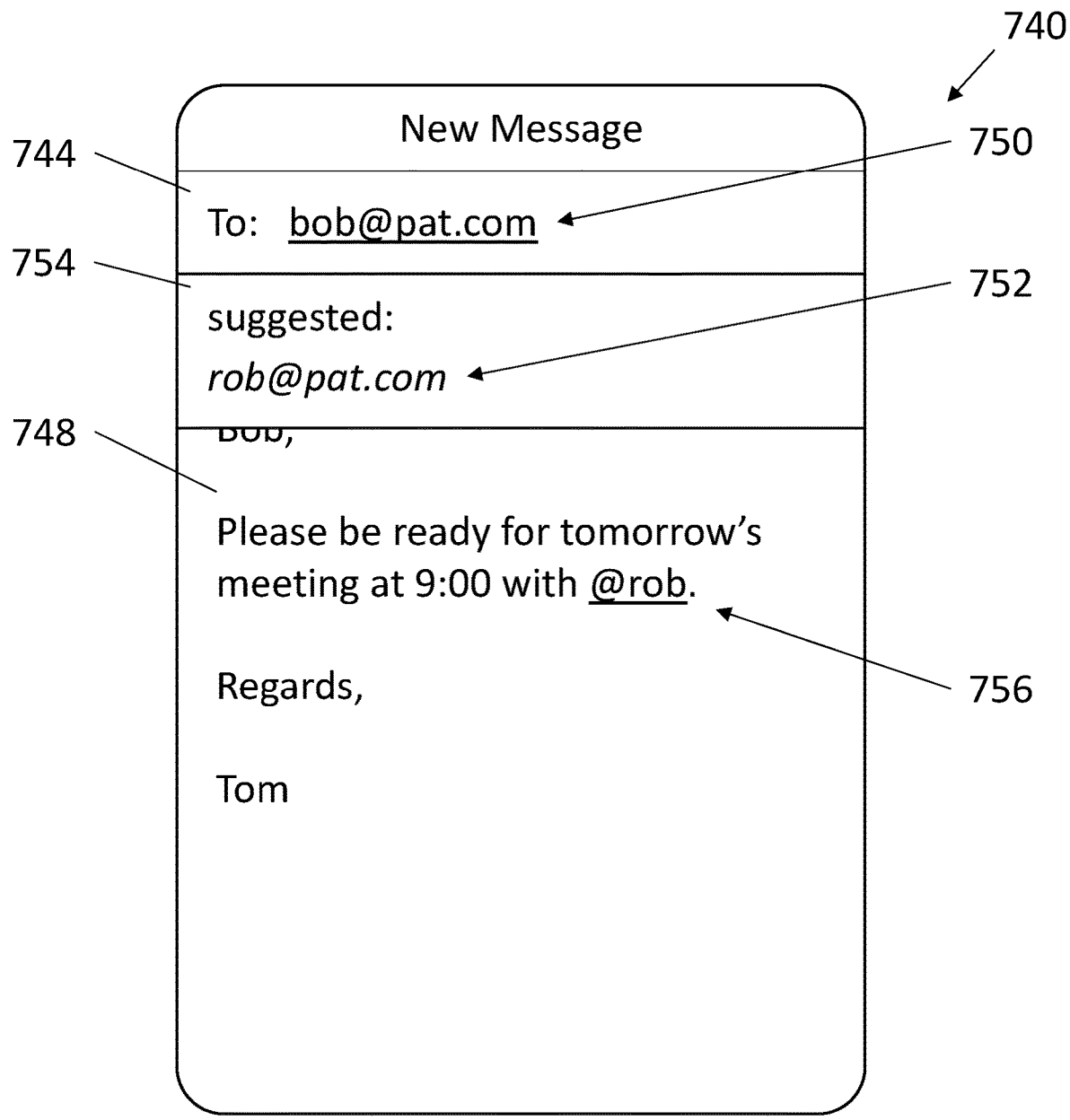

FIG. 7-1 is a representation of a GUI of a message 740, according to at least one embodiment of the present disclosure. In the embodiment shown, the message has been at least partially drafted, including an intended recipient 750 in a recipient field 744, a subject in the subject line 746, and a message in the body 748 of the message 740. The contact manager may review the content of the message. In some embodiments, the body 748 may include an identifier 756 in the text of the message. For example, the identifier 756 shown is an @mention for @rob. Other implementations may identify titles or relationship identifiers, such as "@manager" "@allmanagers" or other identifiers similar to other implementations described herein. In this example, the contact manager may identify the identifier 756 within the body of the message. Using the identifier, the contact manager may access the contact database and determine one or more related contacts.

As may be seen in FIG. 7-2, the contact manager may determine a related recipient 752, which may be used to populate a related contact field 754 with the contact information for the related recipient 752. In some embodiments, the user may select an icon of the suggested related recipient 752, and the contact manager may populate the recipient field 744 with the contact information for the related recipient based on selection of the icon. In one or more embodiments, the address of the related recipient 752 is added automatically based on detecting the identifier 756 within the body 748 of the message 740 (e.g., without requiring additional user input, such as selecting an icon of the related recipient 752, as shown in FIG. 7-2).

While FIG. 7-1 and FIG. 7-2 include an explicit identifier in terms of an @mention or other explicit identifier. But it should be understood that the body 748 may include other identifying information. For example, as may be seen in FIG. 8, a body 848 of a message 840 includes the text "Please be ready for tomorrow's meeting at 9:00 with your boss." The contact manager may review the body of the text and identify one or more keywords. For example, the contact manager may identify the words "your boss." The contact manager may then determine that the identifier 856 "manager" is associated with the words "your boss." The contact manager may then access the contact database and, with the identifier 856 manager, determine contact information mapped to the related recipient 852 based on determining the association between the identifier 856 and the intended recipient 850. The contact manager may populate the contact information in a related contact field 854, where the user may select it for inclusion in the recipient field 844. In one or more embodiments, the address for the related recipient 852 is added automatically based on detecting the identifier 856 and determining that the identifier 856 associated with the intended recipient 850 maps to an address of the related recipient 852. Moreover, while the example above is discussed in connection with a text-based input mechanism, similar features may be implemented in connection with a voice-based input in which a user vocally provides an input of "Please be ready for tomorrow's meeting at 9:00 with your boss."

The contact manager may detect the identifier 856 in a variety of ways. For example, in one or more embodiments, the contact manager utilizes a natural language processor or model to parse language from the body 848 of the message 840 and determine that the text of the body 848 refers to a boss of the intended recipient 850. In one or more embodiments, the contact manager utilizes a rule-based or machine learning model to accurately identify one or more identifiers in accordance with examples described herein. In one or more embodiments, the contact manager may flag a particular term and provide a selectable icon requesting confirmation from a user of a client device that the recipient field 844 should include a determined related recipient 852, consistent with the example shown in FIG. 8.

Figure 8:
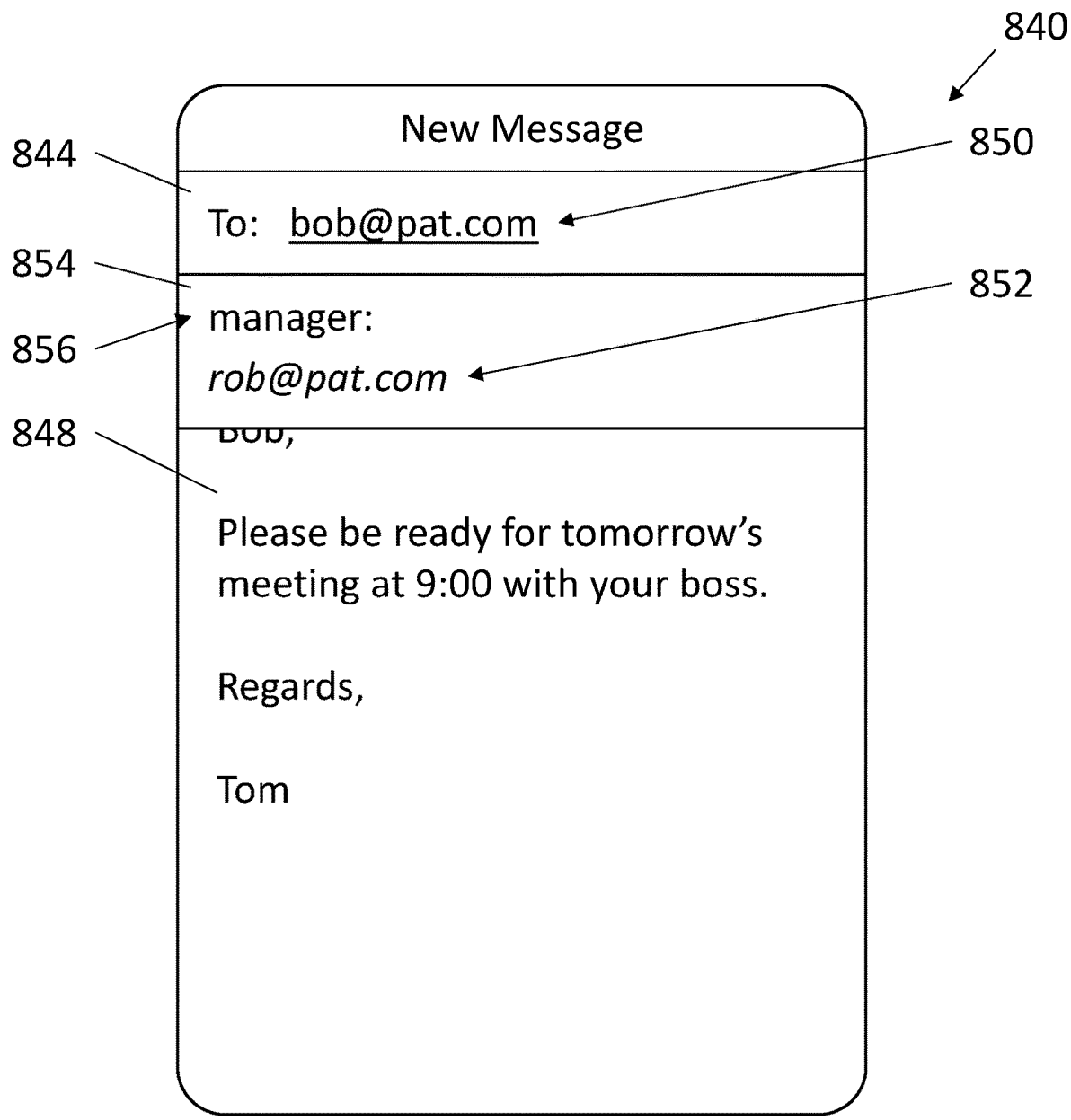
FIG. 8 a representation of a messaging interface, according to at least one embodiment of the present disclosure.

In one or more embodiments, population of the contact information within the recipient field 844 is performed automatically (e.g., without requiring additional input from the user composing the message). Alternatively, upon identifying the identifier (e.g., "your boss") within the body of the message, the contact manager may provide an indicator, such as a hyperlink or other icon that enables the user to view one or more suggested contacts to include within the recipient field 844. For example, in one or more embodiments, the contact manager causes the related recipient(s) 852 to be displayed upon selection of the indicator, as shown in FIG. 8.

Figure 9:
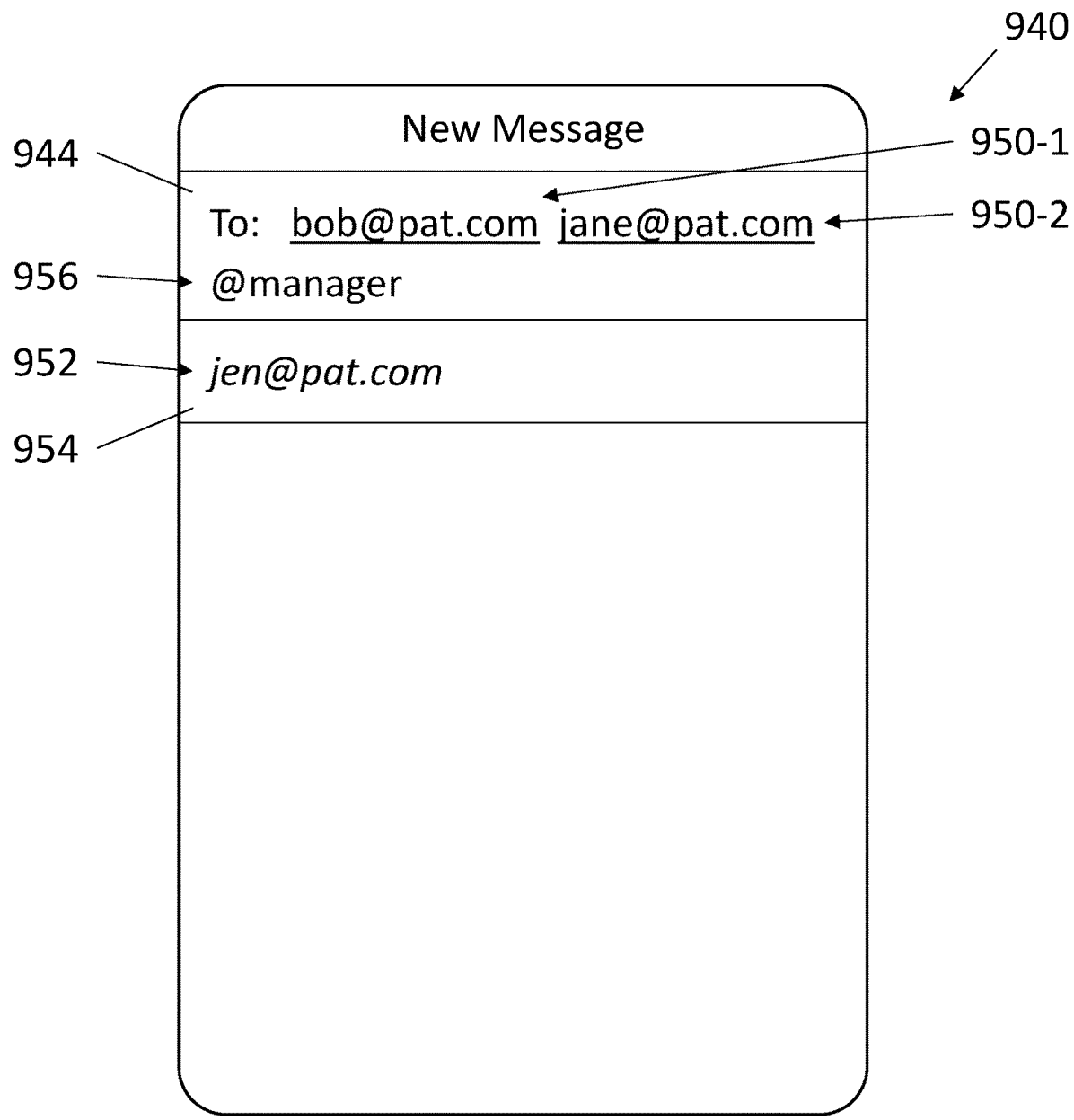
FIG. 9 a representation of a messaging interface, according to at least one embodiment of the present disclosure.

FIG. 9 is a representation of a GUI of an electronic message 940, according to at least one embodiment of the present disclosure. The message 940 includes multiple intended recipients (collectively 950) in a recipient field 944. Specifically, the message 940 includes a first intended recipient 950-1 and a second intended recipient 950-2. An identifier 956 is input into the recipient field 944. The contact manger may receive the identifier 956 from the input in the recipient field 944. Using the identifier 956 and the relationship information in the contact database, the contact manager may determine contact information for a related contact 952. The contact manager may populate the contact information for the related contact 952 in a related contact field 954. The user may then select the related contact 952 and the contact manager may populate the contact information for the related contact 952 in the recipient field.

In the embodiment shown, the contact manger may associate the identifier 956 with the second intended recipient 950-2 based on a proximity of the identifier 956 to the second intended recipient 950-2. The identifier 956 is located immediately adjacent, or immediately after the second intended recipient 950-2. The contact manager may associate the identifier 956 with the intended recipient 950 that the identifier 956 is closest to. In some embodiments, the contact manager may associate the identifier 956 with the intended recipient 950 immediately preceding the identifier 956.

Figure 10:
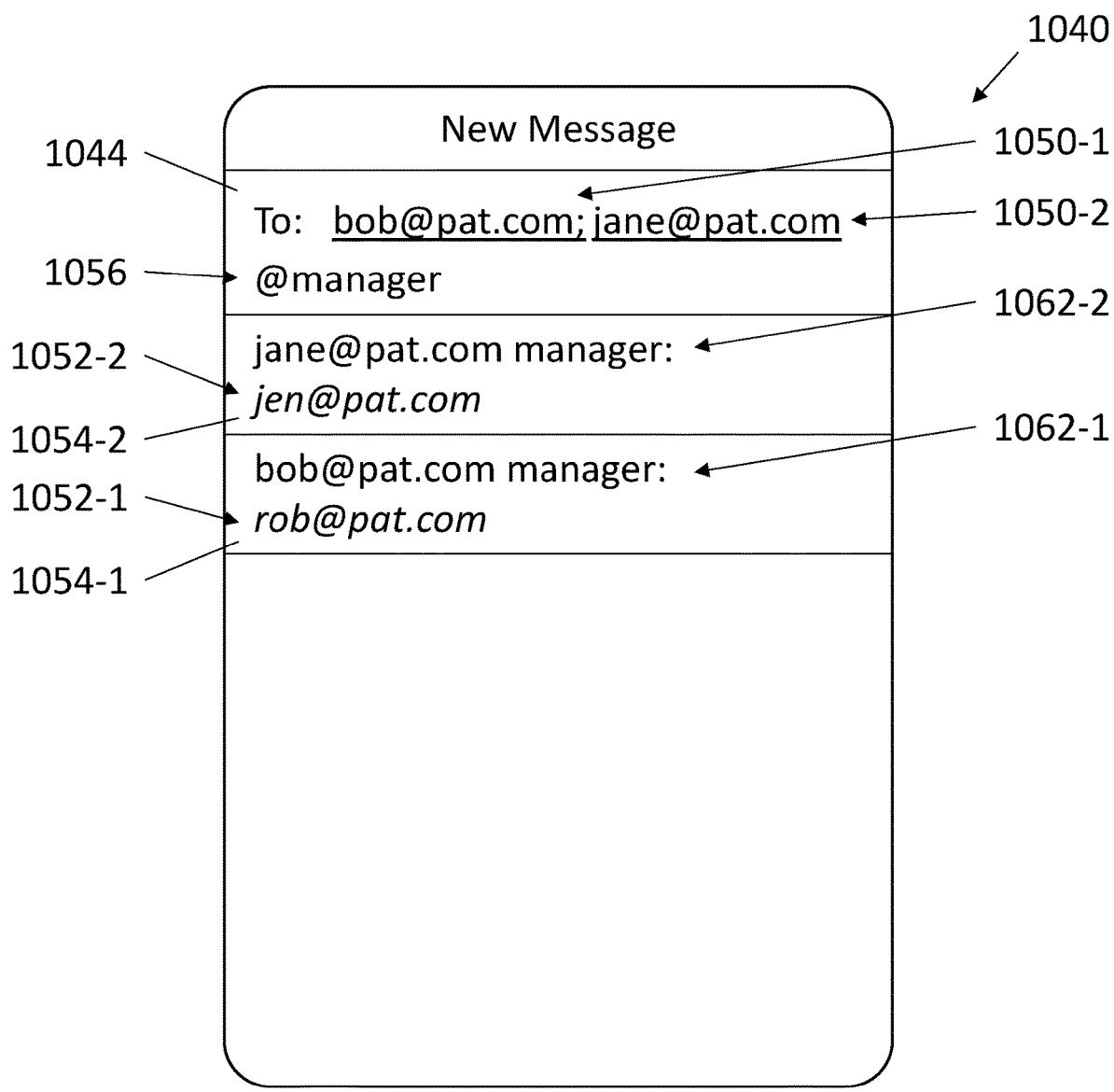
FIG. 10 a representation of a messaging interface, according to at least one embodiment of the present disclosure.

FIG. 10 is a representation of a GUI of a message 1040, according to at least one embodiment of the present disclosure. The message 1040 includes multiple intended recipients (collectively 1050) in a recipient field 1044. Specifically, the message 1040 includes a first intended recipient 1050-1 and a second intended recipient 1050-2 in the recipient field 1044. The recipient field 1044 further includes an identifier 1056 following the second intended recipient 1050-2.

The contact manager may receive the identifier 1056 from the recipient field 1044. In some embodiments, the contact manager may associate the identifier 1056 with each intended recipient 1050. In the example shown in FIG. 10, the contact manager may associate the identifier 1056 with both the first intended recipient 1050-1 and the second intended recipient 1050-2 based on relationships with each of the intended recipients 1050-1 and 1050-2, respectively. The contact manager may access the contact database and, using the identifier 1056, and determine related recipients (collectively 1052) for the intended recipients 1050.

In the embodiment shown, the contact manager determines a first related recipient 1052-1 for the first intended recipient 1050-1 and a second related recipient 1052-2 for the second intended recipient 1050-2. The contact manager may populate first contact information for the first related recipient 1052-1 in a first related contact field 1054-1 and second contact information for the second related recipient 1052-2 in a second related contact field 1054-2. The user may select one or both of the contact information for the related recipients 1052, which may cause the contact manager to populate the contact information for the related recipient in the recipient field 1044.

In the embodiment shown in FIG. 10, the related contact fields 1054 includes a description (collectively 1062) of the related recipient 1052. The first contact field 1054-1 includes a first description 1062-1, which is a description that the first related recipient 1052-1 is the manager of the first intended recipient 1050-1. The second contact field 1054-2 includes a second description 1062-2, which is a description that the second related recipient 1052-2 is the manager of the second intended recipient 1050-2. This may allow the user to select which of the related recipients 1052 to include in the recipient field 1044. When the user does select one or both of the related recipients 1052, the contact manager may populate the respective contact information in the recipient field 1044.

Figure 11:
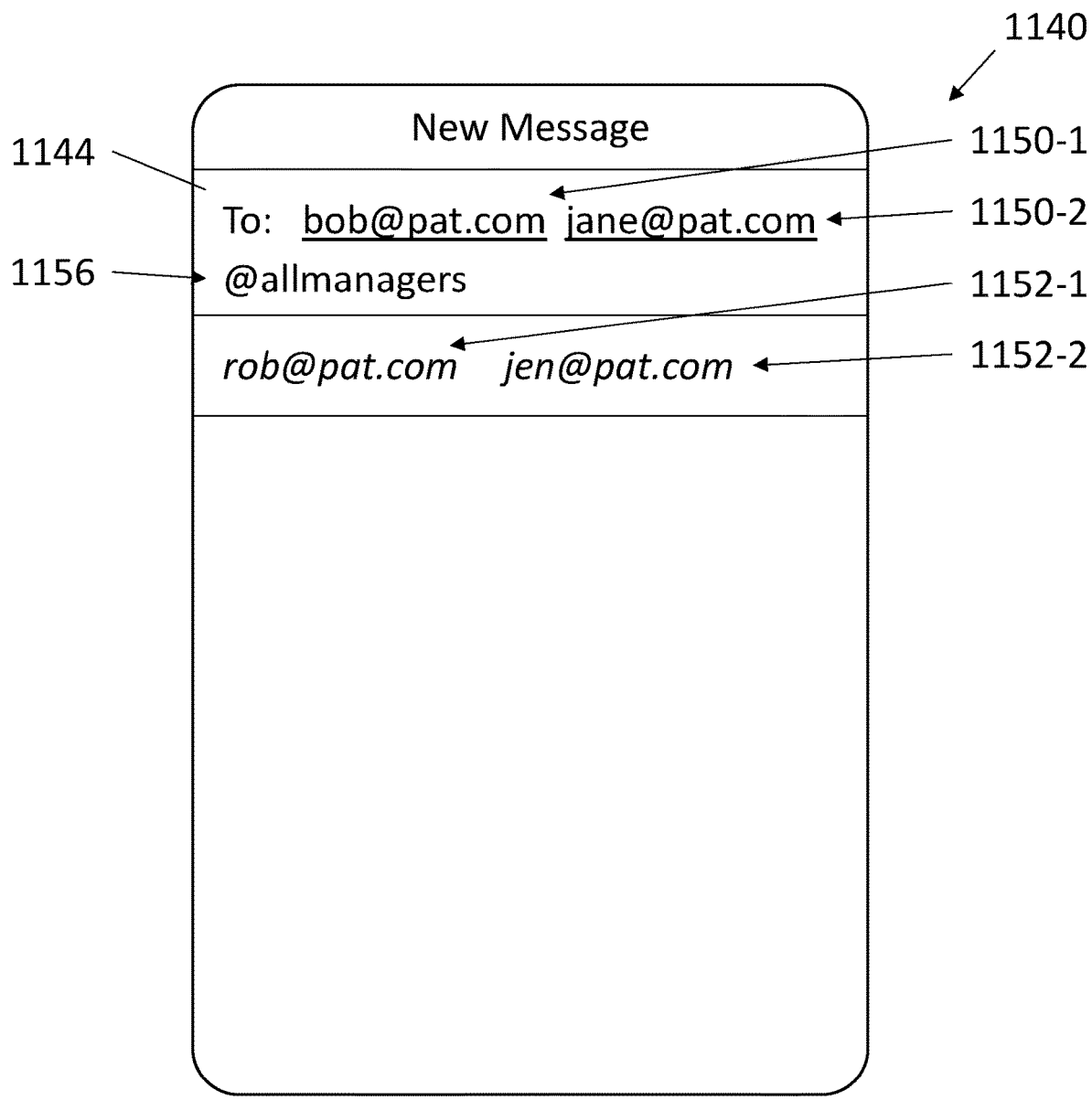
FIG. 11 a representation of a messaging interface, according to at least one embodiment of the present disclosure.

FIG. 11 is a representation of a GUI of an electronic message 1140, according to at least one embodiment of the present disclosure. The message 1140 includes a plurality of intended recipients (collectively 1150) entered into a recipient field 1144. Specifically, the recipient field 1144 includes a first intended recipient 1150-1 and a second intended recipient 1150-2. The recipient field 1144 also includes an input of an identifier 1156. The identifier 1156 shown is @allmanagers. In accordance with at least one embodiment of the present disclosure, the identifier 1156 @allmanagers may identify as a related recipient (collectively 1152) the manager for each of the intended recipient 1150.

In the example shown, the first intended recipient 1150-1 has a different manager than the second intended recipient 1150-2. When the contact manager receives the identifier 1156 (e.g., @allmanagers), the contact manager may access the contact database and determine the managers of both the first intended recipient 1150-1 and the second intended recipient 1150-2. As may be seen, the contact manager has populated contact information for a first related recipient 1152-1, who may be the manager of the first intended recipient 1150-1. The contact manager has further populated contact information for a second related recipient 1152-2, who may be the manager of the second intended recipient 1150-2. The user may then select one or both of the contact information for the related recipients 1152 to populate in the recipient field 1144. In the example shown in FIG. 11, contact information for both the first related recipient 1152-1 and the second related recipient 1152-2 may be populated based on a single identifier and in response to a single input (e.g., entering the identifier, or confirming a selection of the displayed related recipients).

Figure 12:
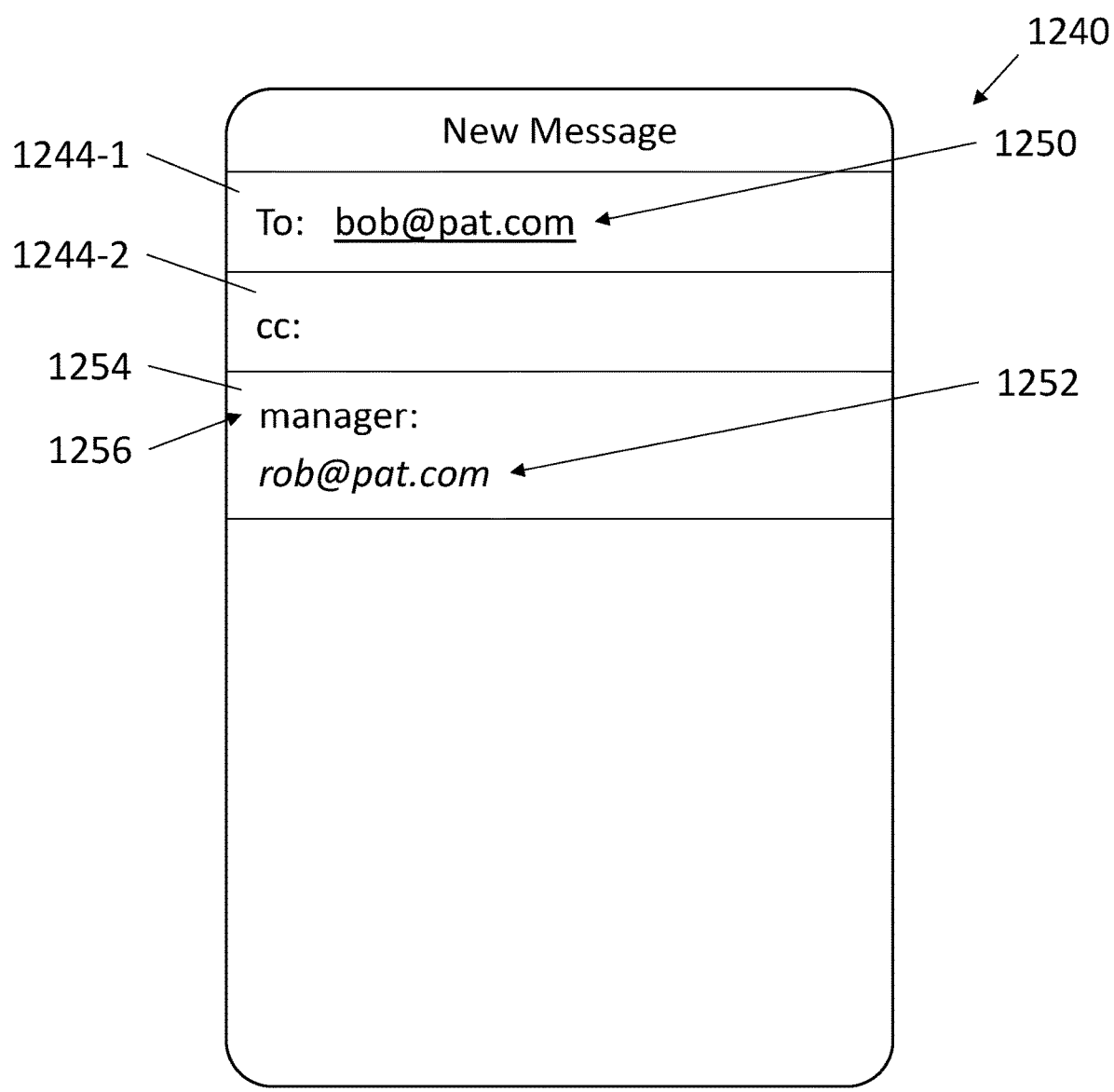
FIG. 12 a representation of a messaging interface, according to at least one embodiment of the present disclosure.

FIG. 12 is a representation of a GUI of a message 1240, according to at least one embodiment of the present disclosure. The message 1240 includes an intended recipient 1250 in a first contact field 1244-1. A contact manager may receive an identifier 1256 of a related recipient 1252. Using the identifier 1256, the contact manager may access the contact database to determine a contact for the related recipient 1252. In some embodiments, the contact manager may populate a related contact field 1254 with one or both of the identifiers or the contact information for the related recipient 1252.

In some embodiments, upon receipt of a selection of the related recipient 1252, the contact manager may populate the contact information for the related recipient in a second contact field 1244-2. As discussed herein, conventionally, the first contact field 1244-1 and the second contact field 1244-2 may be separate and independent. For example, when a user is inputting contact information for other identifying information of the intended recipient 1250, the contact information may only be populated in the contact field 1244 in which the input is received. In some embodiments, the contact manager may populate the contact information for the related recipient 1252 in the second recipient field 1244-2. In some embodiments, the user may select in which of the recipient fields 1244 the related recipient 1252 should be populated.

When presenting the contact information for the related recipient 1252 in the related contact field 1254, the contact manager may maintain the contact information in the contact field 1254. To populate the contact information for the related recipient 1252 in one of the recipient fields 1244, the contact manager may transmit the contact information to the intended recipient fields 1244. This may help to improve the efficiency and flexibility of the contact manager. In this manner, the contact manager may populate the contact information for the related recipient 1252 in any desired recipient field 1244.

Figure 13:
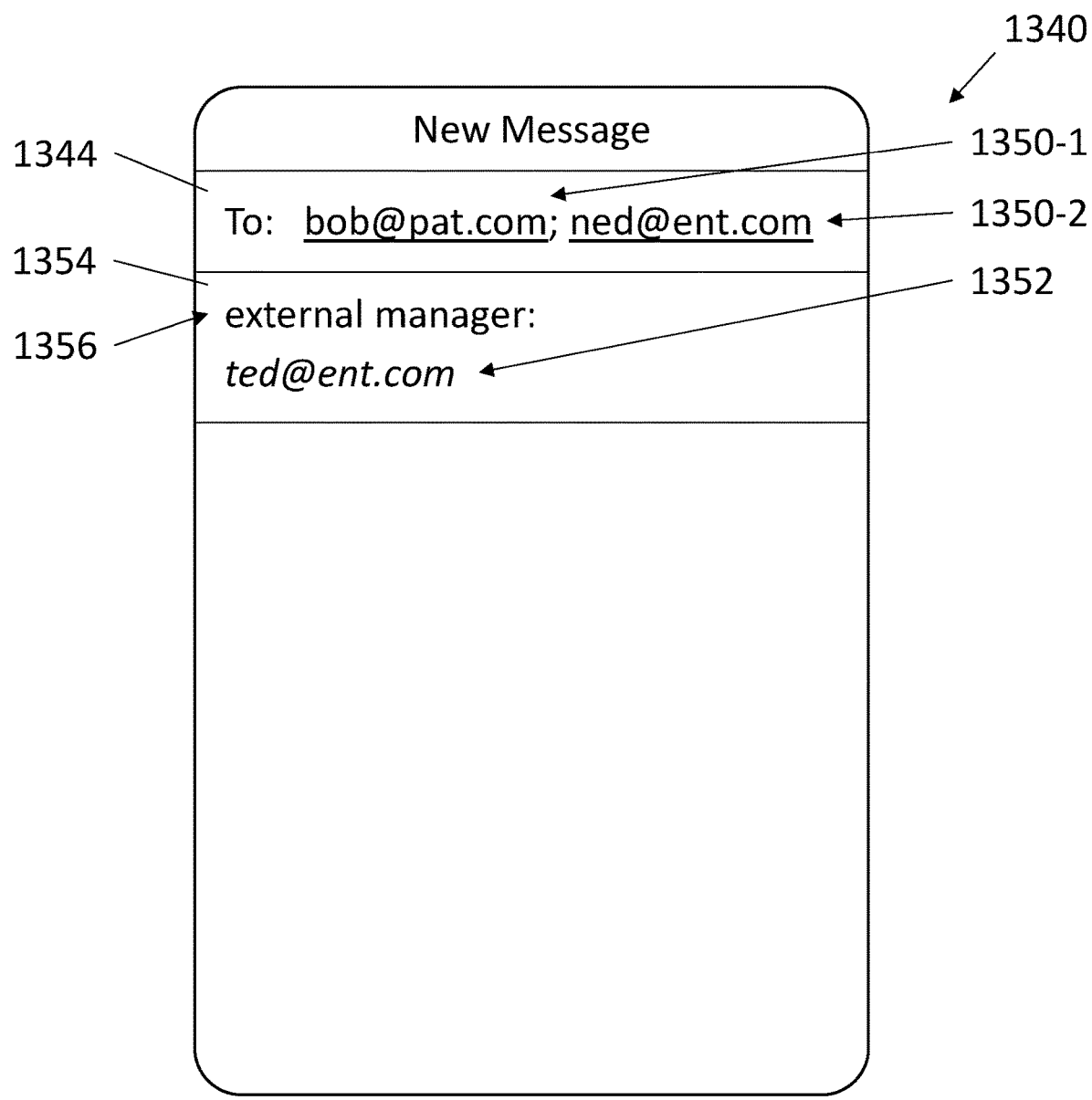
FIG. 13 a representation of a messaging interface, according to at least one embodiment of the present disclosure.

FIG. 13 is a representation of a GUI for a message 1340, according to at least one embodiment of the present disclosure. The message 1340 includes a plurality of intended recipients (collectively 1350) in a recipient field 1344. Specifically, the recipient field 1344 includes a first intended recipient 1350-1 and a second intended recipient 1350-2 in the recipient field 1344. In the embodiment shown, the first intended recipient 1350-1 is an internal contact, or a contact within the same organization as the sender of the message 1340. The second intended recipient 1350-2 is an external contact, or a contact within a different organization as the sender of the message 1340.

In some embodiments, the contact manager may receive an identifier 1356 for a related recipient 1352 associated with the second intended recipient 1350-2. As will be seen, the identifier 1356 may be associated with the different organization. The contact manager may be granted access to an external contact database for the external company. The contact manager may use the identifier 1356 and relationship information in the external contact database to determine an external contact for the related recipient 1352. The contact manager may populate a related contact field 1354 with the contact information for the related recipient 1352. When the user selects the related recipient 1352, the contact manager may populate the recipient field 1344 with the contact information for the external contact as the related recipient 1352. By allowing the contact manager access to the external contact database, the contact manager may increase the efficiency and flexibility of operation of adding contact information to a message 1340.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
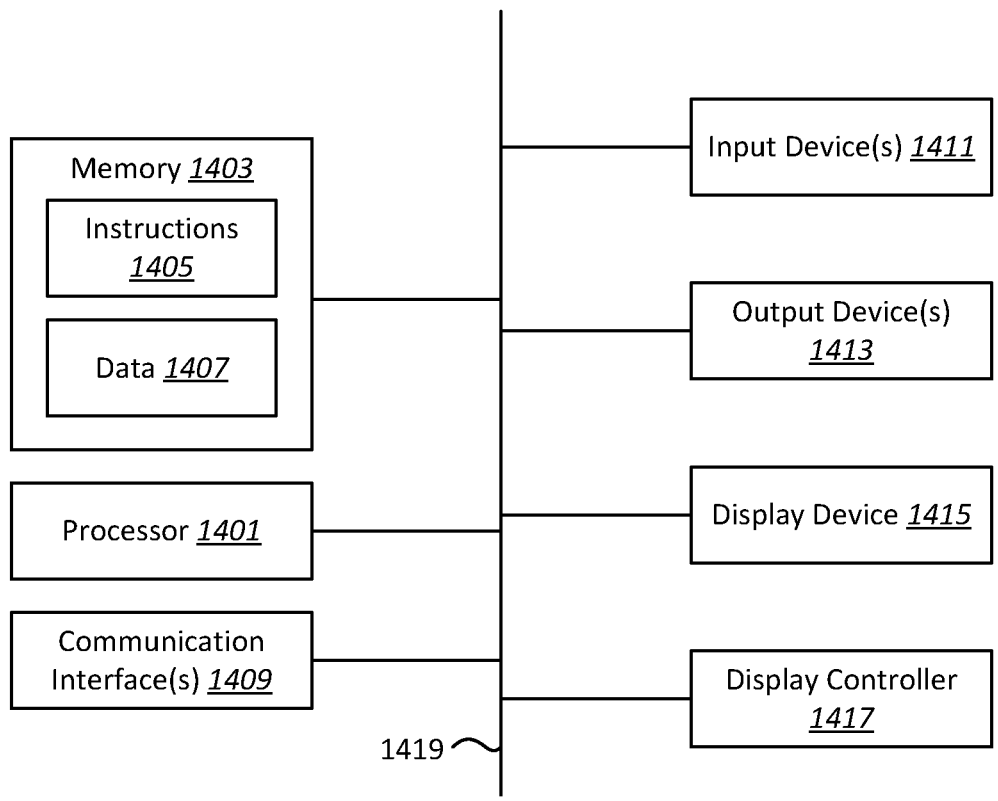
FIG. 14 is a representation of a computing system, according to at least one embodiment of the present disclosure.

FIG. 14 illustrates certain components that may be included within a computer system 1400. One or more computer systems 1400 may be used to implement the various devices, components, and systems described herein.

The computer system 1400 includes a processor 1401. The processor 1401 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1401 may be referred to as a central processing unit (CPU). Although just a single processor 1401 is shown in the computer system 1400 of FIG. 14, in an alternative configuration, a combination of processors (e.g., an ARM and DSP) could be used.

The computer system 1400 also includes memory 1403 in electronic communication with the processor 1401. The memory 1403 may be any electronic component capable of storing electronic information. For example, the memory 1403 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1405 and data 1407 may be stored in the memory 1403. The instructions 1405 may be executable by the processor 1401 to implement some or all of the functionality disclosed herein. Executing the instructions 1405 may involve the use of the data 1407 that is stored in the memory 1403. Any of the various examples of modules and components described herein may be implemented, partially or wholly, as instructions 1405 stored in memory 1403 and executed by the processor 1401. Any of the various examples of data described herein may be among the data 1407 that is stored in memory 1403 and used during execution of the instructions 1405 by the processor 1401.

A computer system 1400 may also include one or more communication interfaces 1409 for communicating with other electronic devices. The communication interface(s) 1409 may be based on wired communication technology, wireless communication technology, or both. Some examples of communication interfaces 1409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1400 may also include one or more input devices 1411 and one or more output devices 1413. Some examples of input devices 1411 include a keyboard, mouse, microphone, remote control device, button, joystick, trackball, touchpad, and lightpen. Some examples of output devices 1413 include a speaker and a printer. One specific type of output device that is typically included in a computer system 1400 is a display device 1415. Display devices 1415 used with embodiments disclosed herein may utilize any suitable image projection technology, such as liquid crystal display (LCD), light-emitting diode (LED), gas plasma, electroluminescence, or the like. A display controller 1417 may also be provided, for converting data 1407 stored in the memory 1403 into text, graphics, and/or moving images (as appropriate) shown on the display device 1415.

The various components of the computer system 1400 may be coupled together by one or more buses, which may include a power bus, a control signal bus, a status signal bus, a data bus, etc. For the sake of clarity, the various buses are illustrated in FIG. 14 as a bus system 1419.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for composing a communication within an electronic communication application, the method comprising:
    identifying a first intended recipient and a second intended recipient in a recipient field of an electronic communication;
    identifying a related recipient identifier included within the recipient field of the electronic communication separate from the first intended recipient and the second intended recipient;
    determining to associate the related recipient identifier with the first intended recipient based on determining a first correspondence between the related recipient identifier and the first intended recipient and a second correspondence between the related recipient identifier and the second intended recipient;
    accessing a plurality of user profiles from a contact database to identify relationship information being maintained for respective contacts in the contact database;
    based on associating the related recipient identifier with the first intended recipient, determining a first contact from the contact database based on the related recipient identifier, relationship information from a first user profile of the first intended recipient, and relationship information from a second user profile of the first contact; and
    based on determining a relationship between the first contact and the first intended recipient, adding the first contact as a first related recipient to the electronic communication within a graphical user interface.

2. The method of claim 1, wherein determining to associate the related recipient identifier with the first intended recipient further includes:
    determining a first proximity between the first intended recipient and the related recipient identifier within the recipient field of the electronic communication;
    determining a second proximity between the second intended recipient and the related recipient identifier within the recipient field of the electronic communication; and
    associating the related recipient identifier with the first intended recipient based on the first proximity having a smaller distance than the second proximity.

3. The method of claim 2, wherein determining to associate the related recipient identifier with the first intended recipient is based on analyzing a message body to identify an additional recipient identifier in the message body.

4. The method of claim 1, wherein identifying the related recipient identifier includes detecting entry of a relationship term within the recipient field of the electronic communication.

5. The method of claim 4, wherein the relationship term includes an indication of a hierarchical relationship within an organization included within the contact database.

6. The method of claim 4, further comprising analyzing the relationship term to determine a semantic meaning, wherein determining the first contact includes comparing the semantic meaning to the relationship information corresponding to the first intended recipient and the first contact the contact database to identify a match based on the semantic meaning of the relationship term.

7. The method of claim 1, wherein determining to associate the related recipient identifier with the first intended recipient is based on determining that the related recipient identifier is more relevant to the first intended recipient.

8. The method of claim 1, wherein populating the recipient field with the first contact as the first related recipient includes adding a communication address of the first contact within a different recipient field of the electronic communication than includes the first intended recipient.

9. The method of claim 8, wherein the first intended recipient is in a primary recipient field and the first related recipient is in a secondary recipient field within the graphical user interface.

10. The method of claim 1, wherein populating the recipient field with the first contact is performed automatically without requiring additional user input.

11. The method of claim 1, further comprising:
    providing, within an interactive interface, an option to add the first contact to the electronic communication as a related recipient; and
    receiving a selection of the option associated with the first contact, wherein populating the recipient field with the first contact is performed in response to the selection of the option.

12. The method of claim 1, further comprising determining to associate the related recipient identifier with both the first intended recipient and the second intended recipient.

13. The method of claim 12, further comprising:
    detecting a selection of the first intended recipient;
    in response to detecting the selection, displaying the related recipient identifier in a user interface associated with the first intended recipient that differs from the graphical user interface; and
    displaying the first contact in the user interface associated with the first intended recipient.

14. A system, comprising:
    at least one processor;
    memory in electronic communication with the at least one processor; and
    instructions stored in the memory, the instructions being executable by the at least one processor to:

identify a first intended recipient and a second intended recipient in a recipient field of an electronic communication;

identify a related recipient identifier included within the recipient field of the electronic communication separate from the first intended recipient and the second intended recipient;

determine to associate the related recipient identifier with the first intended recipient based on determining a first correspondence between the related recipient identifier and the first intended recipient and a second correspondence between the related recipient identifier and the second intended recipient;

access a plurality of user profiles from a contact database to identify relationship information being maintained for respective contacts in the contact database;

based on associating the related recipient identifier with the first intended recipient, determine a first contact from the contact database based on the related recipient identifier, relationship information from a first user profile of the first intended recipient, and relationship information from a second user profile of the first contact;

and based on determining a relationship between the first contact and the first intended recipient add the first contact as a first related recipient to the electronic communication within a graphical user interface.

15. The system of claim 14, wherein identifying the first intended recipient and the second intended recipient is based on detecting communication addresses for the first intended recipient and the second intended recipient within the recipient field of the electronic communication, and wherein the related recipient identifier and the communication addresses for the first intended recipient and the second intended recipient are each included within the recipient field of the electronic communication as separate entries.

16. The system of claim 14, wherein identifying the related recipient identifier includes detecting entry of a reference to a relationship of either the first intended recipient or the second intended recipient.

17. The system of claim 16, further comprising determining to associate the related recipient identifier with both the first intended recipient and the second intended recipient based on the first correspondence and the second correspondence.

18. The system of claim 14, wherein receiving the related recipient identifier includes:

providing, via the graphical user interface, one or more icons associated with the first related recipient and a second related recipient; and detecting selection of an icon from the one or more icons.

19. A non-transitory computer-readable medium storing instructions that, when executed by at least one processor, cause a computer system to:

identify a first intended recipient and a second intended recipient in a recipient field of an electronic communication;

identify a related recipient identifier included within the recipient field of the electronic communication separate from the first intended recipient and the second intended recipient;

determine to associate the related recipient identifier with the first intended recipient based on determining a first correspondence between the related recipient identifier and the first intended recipient and a second correspondence between the related recipient identifier and the second intended recipient;

access a plurality of user profiles from a contact database to identify relationship information being maintained for respective contacts in the contact database;

based on associating the related recipient identifier with the first intended recipient, determine a first contact from the contact database based on the related recipient identifier, relationship information from a first user profile of the first intended recipient, and relationship information from a second user profile of the first contact;

and based on determining a relationship between the first contact and the first intended recipient, add the first contact as a first related recipient to the electronic communication within a graphical user interface.

20. The non-transitory computer-readable medium of claim 19, wherein identifying the first intended recipient is based on detecting communication addresses for the first intended recipient within the recipient field of the electronic communication, and wherein the communication addresses for the first intended recipient and the related recipient identifier are both included within the recipient field of the electronic communication as separate entries.

* * * * *